(12) United States Patent
Zhou

(10) Patent No.: US 10,076,798 B2
(45) Date of Patent: Sep. 18, 2018

(54) PORTABLE SHORT ELECTRIC ARC PROCESSING SYSTEM

(71) Applicant: XINJIANG SHORT ELECTRIC ARC SCIENTIFIC & TECHNICAL DEVELOPMENT CO., LTD., Urumqi, Xinjiang Uygur Autonomous Region (CN)

(72) Inventor: Bisheng Zhou, Urumqi (CN)

(73) Assignee: XINJIANG SHORT ELECTRIC ARC SCIENTIFIC & TECHNICAL DEVELOPMENT CO., LTD., Urumqi (CN)

( * ) Notice: Subject to any disclaimer, the term of this patent is extended or adjusted under 35 U.S.C. 154(b) by 0 days.

(21) Appl. No.: 15/320,666

(22) PCT Filed: Aug. 14, 2015

(86) PCT No.: PCT/CN2015/000590
§ 371 (c)(1),
(2) Date: Dec. 20, 2016

(87) PCT Pub. No.: WO2016/074335
PCT Pub. Date: May 19, 2016

(65) Prior Publication Data
US 2017/0197266 A1 Jul. 13, 2017

(30) Foreign Application Priority Data

Nov. 11, 2014 (CN) .......................... 2014 1 0632093

(51) Int. Cl.
*B23H 1/02* (2006.01)
*B23H 11/00* (2006.01)
*B23K 9/09* (2006.01)

(52) U.S. Cl.
CPC ............... *B23H 1/02* (2013.01); *B23H 1/022* (2013.01); *B23H 11/00* (2013.01); *B23K 9/09* (2013.01)

(58) Field of Classification Search
CPC . B23H 1/02; B23H 7/02; B23H 11/00; B23H 1/022; B23K 9/013; B23K 9/0135; B23K 35/0216; H01J 37/31
(Continued)

(56) References Cited

U.S. PATENT DOCUMENTS 4,393,292 A * 7/1983 Inoue ....................... B23H 1/02
219/69.14
5,399,826 A * 3/1995 Kaneko .................... B23H 1/02
219/69.13
(Continued)

FOREIGN PATENT DOCUMENTS

| CN | 2584334 Y | 11/2003 |
|---|---|---|
| CN | 201279638 Y | 7/2009 |

(Continued)

*Primary Examiner* — Alexander Valvis
(74) *Attorney, Agent, or Firm* — Jiwen Chen

(57) ABSTRACT

A portable movable discharge processing system by short electric arc, including a power supply cooling water tank, a short electric arc cutting power supply, a ring current device a feeding mechanism, a hanging bracket and a pneumatic ring current tool mounted on the hanging bracket, which are successively and cooperatively mounted on a horizontal plane; an air compressor and a sewage pump, which are successively connected to the feeding mechanism; a self-priming pump and a movable short-electric arc cutting device control cabinet, which are successively connected to the air compressor; an anode device which is connected to the movable short-electric arc cutting device control cabinet through an anode cable; a cathode device which is connected to the movable short-electric arc cutting device control
(Continued)

cabinet through a cathode cable; and a water pump which is connected to the anode device through a pipeline.

8 Claims, 15 Drawing Sheets

(58) Field of Classification Search
USPC .......................................................... 219/69.1
See application file for complete search history.

(56) References Cited

U.S. PATENT DOCUMENTS

| 2003/0173337 | A1* | 9/2003 | Ito ........................... B23H 1/022 |
| | | | 219/69.14 |
| 2005/0247569 | A1* | 11/2005 | Lamphere .............. B23H 1/022 |
| | | | 205/663 |
| 2007/0256939 | A1 | 11/2007 | Wei et al. |

FOREIGN PATENT DOCUMENTS

| CN | 201586805 U | 9/2010 |
| CN | 201677103 U | 12/2010 |
| CN | 203409379 U | 1/2014 |
| JP | 5988218 A | 5/1984 |

\* cited by examiner

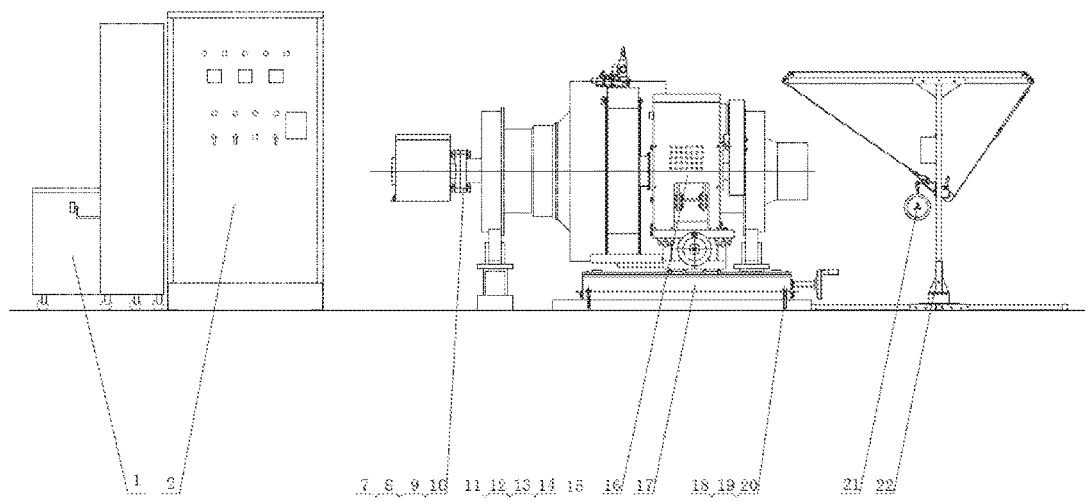
Fig.1 (a)
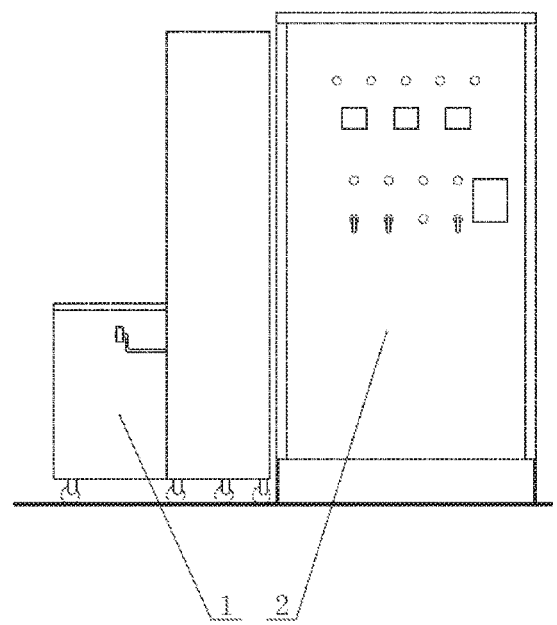
Fig.1 (a-1)

Fig.1 (a-2)

Dismantled piece 1

PORTABLE SHORT ELECTRIC ARC PROCESSING SYSTEM

This is a U.S. national stage application of PCT Application No. PCT/CN2015/000590 under 35 U.S.C. 371, filed Aug. 14, 2015 in Chinese, claiming the Chinese priority application No. 201410632093.X filed Nov. 11, 2014, which are all hereby incorporated by reference.

TECHNICAL FIELD

The present invention refers to short electric arc technology field, particularly to a portable Short Electric Arc Processing System.

BACKGROUND OF THE INVENTION

Discharge of short electric arc refers to an effectively controlled discharge cluster phenomenon with specific current, voltage wave, frequency, amplitude and discharge mode that is generated by scientific mechanical motion and electric action in the action of air-liquid medium.

Short electric arc cutting technology refers to an electric cutting method to corrode metal and non-metal conductive materials by the simulated short electric arc discharge cluster of sparkle discharge cluster produced between two electrodes in the medium action of pressurized air-liquid mixture at certain ratio. It belongs to electric processing technology in special processing industry. It is a new electric processing technology of strong electron current, ion current and arc current cutting and new industrial term.

In the realization of the present invention, the inventor found the defects of inconvenient use, heavy labor intensity and poor safety in the existing technologies.

SUMMARY OF THE INVENTION

In light of the above problems, an object of the present invention is to provide a portable short electric arc processing system to achieve the advantages of convenience in use, less labor intensive and excellent safety.

To achieve the above object, the present invention provides a portable short electric arc processing system comprising: a cooling water tank, a short electric arc power supply, a circulation device, a feeding mechanism, a hanger and a pneumatic circulation tool mounted on the hanger, all of which are successively/sequentially and cooperatively mounted on a horizontal plane; an air compressor and a draining pump both of which are successively connected to the feeding mechanism through a pipeline; a sucking pump and a control cabinet for the short-electric arc processing system, both of which are successively connected to the air compressor through a pipeline; an anode device which is connected to the control cabinet through a cable to the negative pole of the power supply; a cathode device which is connected to the control cabinet through a cable to the positive pole of the power supply; and a water pump which is connected to the cathode device through a pipeline, wherein said power supply is connected to the cooling water tank, the circulation device, the feeding mechanism, the sucking pump, the control cabinet, the anode device, the pneumatic circulation tool mounted on the hanger, the cathode device and the water pump, respectively.

Preferably, the circulation device comprises a cathode base, a main cathode shaft mounted on the cathode base, a tool electrode fixed to an electrode base mounted on the left end of the cathode main-shaft, a pressure plate for mounting the tool electrode axially, the tool electrode and a shield bracket which are successively and cooperatively mounted on the left and right sides of the electrode base one by one upwards, a left water shield and a right water shield which are vertically mounted on both sides of the electrode base, a pair of electric collectors which are symmetrically mounted over and under the main cathode shaft, an insulation component which is mounted between said pair of electric collectors, a cathode shield which is mounted over said pair of electric collector, a motor which is mounted between the cathode shield and the upper electric collector, an electric brush which is mounted on the motor, a motor pulley, a ball bearing, a lead screw, a pulley bearing and a rear bearing cap all of which are cooperatively mounted on the motor, a tool electrode shield which is mounted on the right end portion of the main cathode shaft, and a grease fitting and a seal and a water-air mixing device which are mounted inside of the tool motor shield.

Preferably, the feeding mechanism comprises a longitudinal base which is set horizontally, a left shield, a railway, a bracket and a water catcher which are mounted over a left end portion of the longitudinal base, a transverse base which is mounted on a middle portion of the longitudinal base, and a right shield which is mounted on a right end portion of the longitudinal base;

a circulation tool base which is mounted on the transverse base, a fixed shaft which is mounted on the circulation tool base, a nut seat and a rail slider which are mounted between the transverse base and the circulation tool base, and a railway which is mounted on the rail slider;

a back hand wheel which is mounted on the right end portion of the longitudinal base, a bearing cap which is mounted between the back hand wheel and the longitudinal base, a transverse front shield and a transverse rear shield which are mounted on the front and rear sides of the longitudinal base which is close to the back hand wheel, a transverse lead screw and a longitudinal lead screw which are mounted under the transverse rear shield, a bearing housing which is mounted in the longitudinally movable base close to the back hand wheel, a ball bearing and a thrust bearing which are mounted in the bearing housing; and a guiding rail hole cover which is mounted between the longitudinal base and the transverse base.

Preferably, the anode device comprises an anode connecting plate which is set vertically, an anode collecting shaft and an anode holder sleeve which are mounted on the anode connecting plate from left to right, an electric brush component, a pressure spring and an anode collector which are located over the anode collecting shaft from left to right, a lead screw which is set horizontally over the anode collecting shaft, an anode bearing housing which is located over the anode holder sleeve and mounted vertically on a right end portion of the lead screw; a ball bearing, an anode bearing end cap and a sealing which are cooperatively mounted between the anode bearing housing and the anode holder sleeve; and a grease fitting, a wiring board and an insulation which are located under the anode holder sleeve and mounted on the anode bearing housing.

Preferably, the circulation device comprises a portable pneumatic circulation tool for a short electric arc processing, and a hanger for hanging the portable pneumatic circulation tool.

Preferably, the portable pneumatic circulation tool comprises an electrode mounting shaft which is set horizontally, a tool electrode which is vertically mounted on the left end portion of the electrode mounting shaft, an electric collecting ring, a ceramic bearing, a spacer, an electric brush component, an electric collector, a first bearing and a connecting shaft which are cooperatively mounted on the electrode mounting shaft one by one from left to right, a second bearing which is located on the right side of the connecting shaft and vertically mounted on the electrode mounting shaft, a main body, a blade-type pneumatic motor, a base, a body valve core, a regulating switch, a handle and a quick air-pipe fitting which are located on the right side of the second bearing and cooperatively mounted on the electrode mounting shaft one by one from left to right, and a strut, a spacer, a handle and a Y-shaped air-pipe fitting which are located under the electrode mounting shaft and cooperatively mounted on the electrode mounting shaft.

Preferably, the hanger comprises a chassis which is set horizontally, a wheel which is vertically mounted on the chassis, a stand which is vertically mounted on the top of the wheel, an adjustable horizontal arm which is horizontally mounted on the top of the stand, a locking component which is aslant mounted between an end portion of the adjustable horizontal arm assembly and the wheel, a bracket and a manual winch which are cooperatively mounted between the locking component and the wheel, a chassis base which is mounted between the chassis and the wheel;

a pulley set and a roller bracket which are mounted between the end portion of the adjustable horizontal arm and the locking component, legs and a bearing which are mounted on the bottom of the chassis, and a remote control box of the power supply and a pneumatic circulation tool which are mounted on the wheel.

Preferably, the power supply comprises a main circuit, a control circuit, a display circuit and a protection circuit, and the control circuit is connected to the main circuit, the display circuit and the protection circuit respectively.

Preferably, the main circuit comprises an AC supply voltage display circuit, an RC resistance-capacitance absorption circuit, a primary voltage regulating circuit, a rectifier transformer, a secondary rectifying circuit, a diverter output circuit and an overload protection and display circuit which are connected successively;

and/or, the control circuit, the protection circuit and the display circuit are made of a control panel typed CTSC070802F and electrical elements, the Protection circuit and the display circuit are incorporated into the control circuit.

The various embodiments of the present invention provide a portable short electric arc processing system comprising: a cooling water tank, a short electric arc power supply, a circulation device, a feeding mechanism, a hanger and a pneumatic circulation tool mounted on the hanger, all of which are successively/sequentially and cooperatively mounted on a horizontal plane; an air compressor and a draining pump both of which are successively connected to the feeding mechanism through a pipeline; a sucking pump and a control cabinet for the short-electric arc processing system, both of which are successively connected to the air compressor through a pipeline; an anode device which is connected to the control cabinet through a cable to the negative pole of the power supply; a cathode device which is connected to the control cabinet through a cable to the positive pole of the power supply; and a water pump which is connected to the cathode device through a pipeline, wherein said power supply is connected to the cooling water tank, the circulation device, the feeding mechanism, the sucking pump, the control cabinet, the anode device, the pneumatic circulation tool mounted on the hanger, the cathode device and the water pump, respectively. The present invention overcome the problems of the prior art to achieve the advantages of convenience in use, less labor intensive and excellent safety.

The present invention will be described in details with reference to the following drawings.

BRIEF DESCRIPTION OF THE DRAWINGS

Figures would further explain the present invention and compose one part of the instructions. They are used together with the implementations to explain the present invention but do not restrict the present invention. In the figures:

In FIG. 1:

Figure 5:
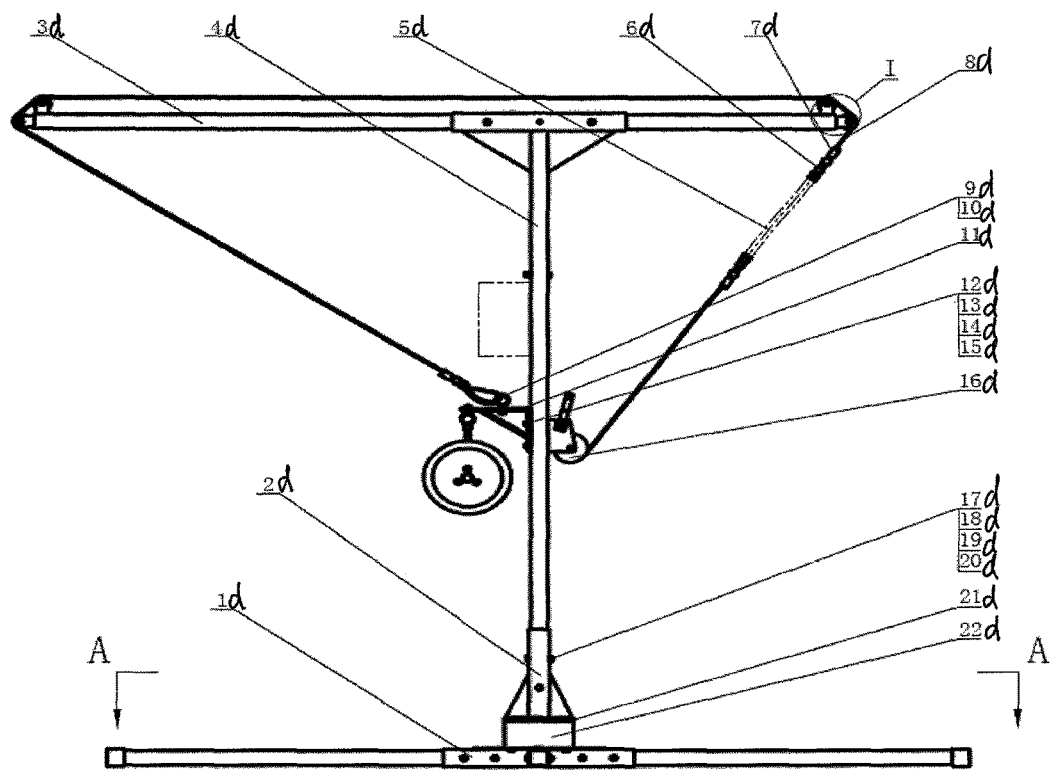
FIG. 5 is the structure diagram of hanging bracket of portable short-electric arc pneumatic circulation tool in the present invention, where (a) is front view, (b) is left view, (c) is the A-A view of (a), (d) is partially enlarged diagram of I in (a) and (e) is the partially enlarged diagram of (II) in (b)
Figure 5:
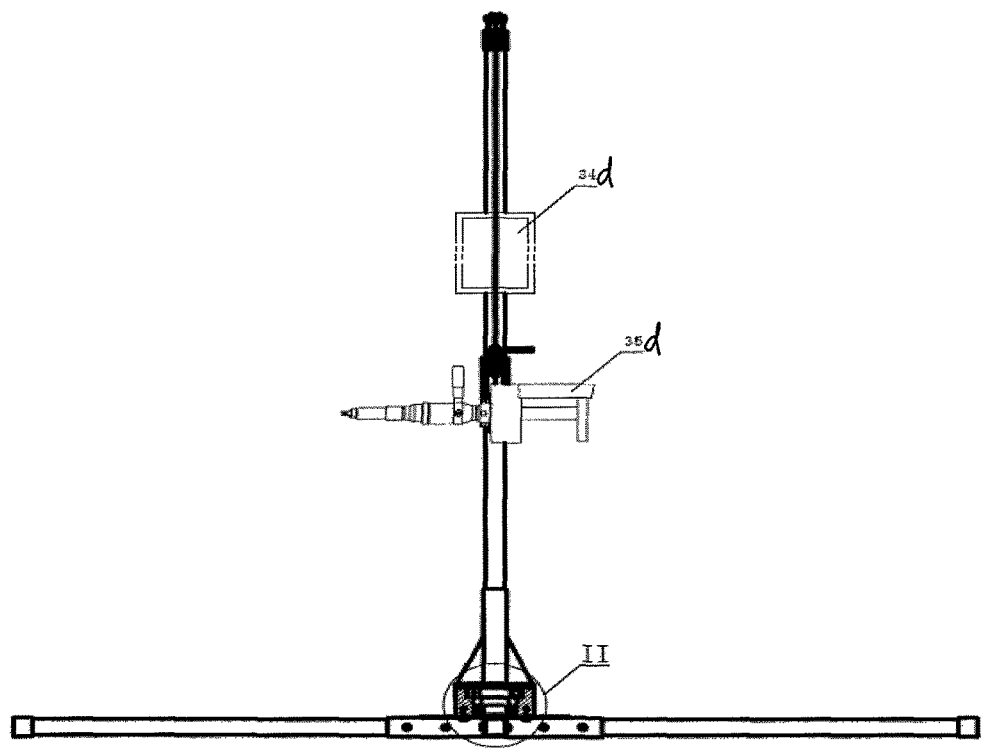
Figure 5:
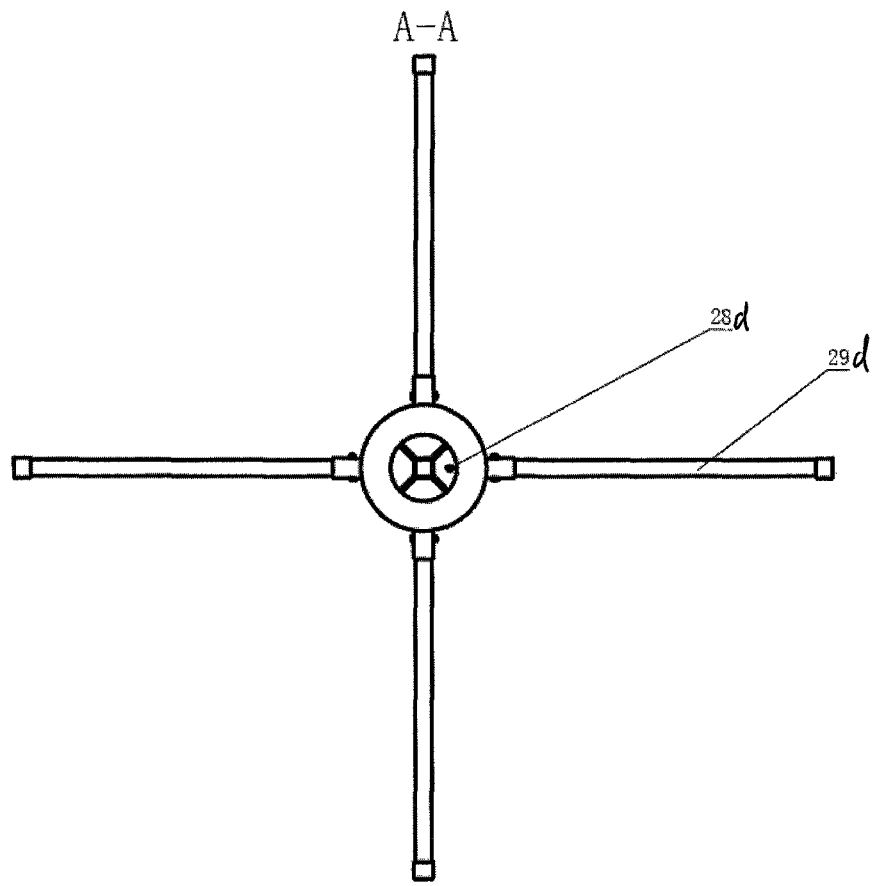
Figure 5:
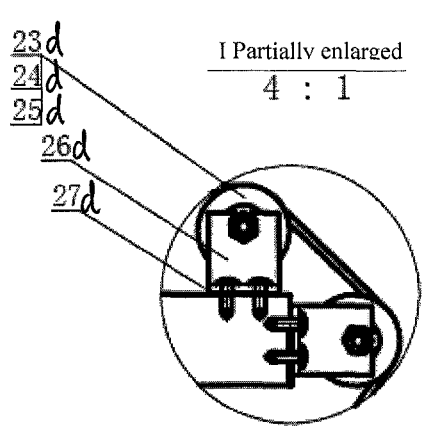
Figure 5:
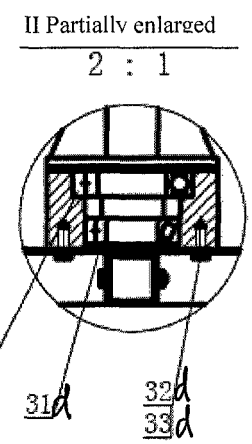

1-cooling water tank; 2-short electric arc cutting power supply; 3-self-priming pump; 4-movable short-electric arc cutting device control cabinet; 5-cathode cable; 6-anode cable; 7-outside hex bolt; 8-nut; 9-elastic washer; 10-washer 20; 11-outside hex bolt; 12-nut; 13-elastic washer; 14-washer; 15-anode device; 16-circulation device; 17-feeding mechanism; 18-outside hex bolt; 19-elastic washer; 20-washer; 21-air pipe; 22-air compressor; 23-steam system; 24-water pipe clamp; 25-water pipe; 26-draining pump; 34-remote control cabinet of short electric arc cutting power supply (consistent with FIG. 5); 35-short electric arc pneumatic circulation tool (consistent with FIG. 5).

FIG. 2:

1*a*-cathode base; 2*a*-main cathode shaft; 3*a*-fixed base of tool electrode; 4*a*-pressure plate for tool electrode; 5*a*-tool electrode; 6*a*-fixed base of shield; 7*a*-front bearing cap; 8*a*-left water block board assembly; 9*a*-right water block board assembly; 10*a*-collector; 11*a*-insulating sleeve; 12*a*-insulating gasket; 13*a*-cathode shield; 14*a*-gear motor; 15*a*-brush; 16*a*-brush racket; 17*a*-pressure spring; 18*a*-deep groove ball bearing; 19*a*-elastic washer; 20*a*-washer; 21*a*-outside hex bolt; 22*a*-motor belt pulley; 23*a*-lead screw; 24*a*-V-shaped belt; 25*a*-tensile pulley; 26*a*-strut; 27*a*- washer; 28a-nut; 29a-belt pulley bearing; 30a-tool electrode shield (stainless plate); 31a-strut I; 32a-grease fitting; 33a-belt pulley of main shaft; 34a-key; 35a-elastic collar; 36a-sealing ring; 37a-rear bearing cap; 38a-round screw; 39a-carriage wheel bolt; 40a-washer; 41a-self-locking nut; 42a-wiring plate; 43a-hexagon socket screw; 44a-outside hex bolt; 45a-nut; 46a-washer; 47a-elastic washer; 48a-outside hex bolt; 49a-nut; 50-washer; 51-elastic washer; 52-outside hex bolt; 53-washer; 54-connecting angle iron; 55-lead screw; 56-nut; 57-washer; 58-outside hex bolt; 59-elastic washer; 60-washer; 61-wiring plate; 62-hexagon socket screw; 63-elastic washer; 64-water-air mixing device.

Figure 3:
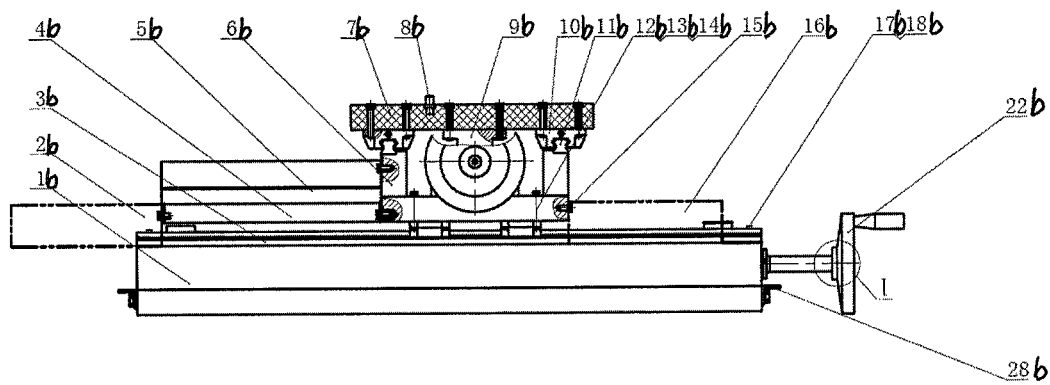
FIG. 3 is structure diagram of feeding device (DHX33A2000YD-02) of the present invention, where (a) is front view, (b) is left view, (c) is top view, (d) is partially enlarged diagram of I in (a), (e) is partially enlarged diagram of II in (b), (f) is partially enlarged diagram of III in (c) and (g) is partially enlarged diagram of IV in (c)
Figure 3:
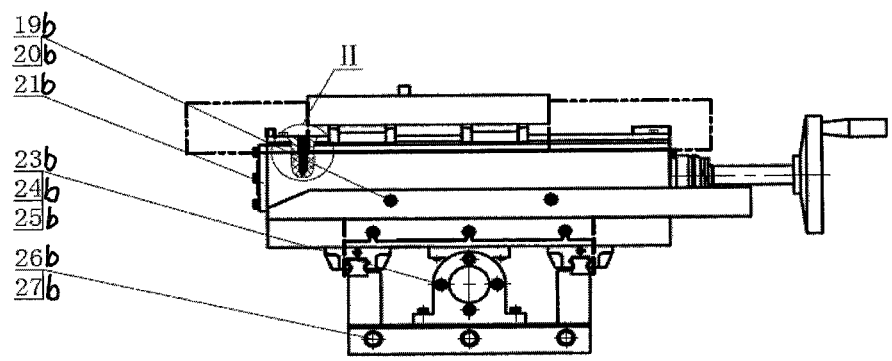
Figure 3:
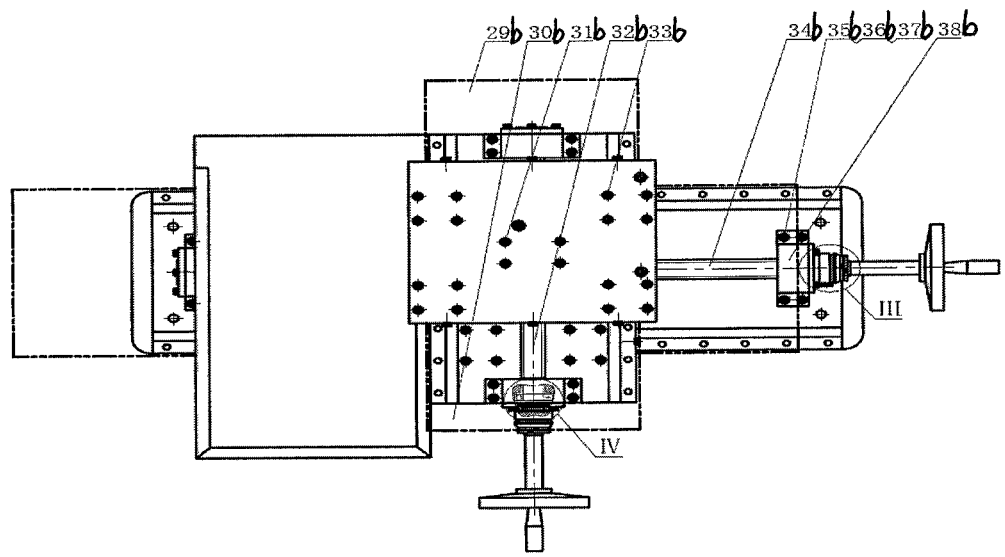
Figure 3:
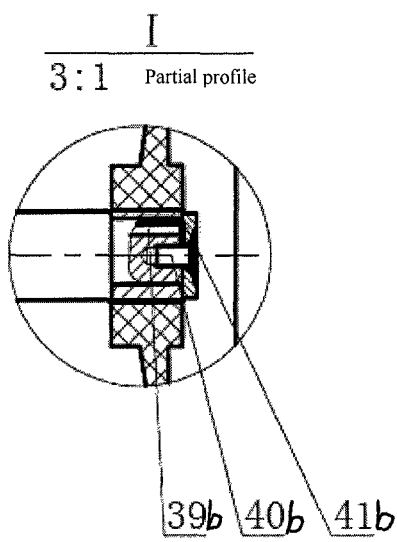
Figure 3:
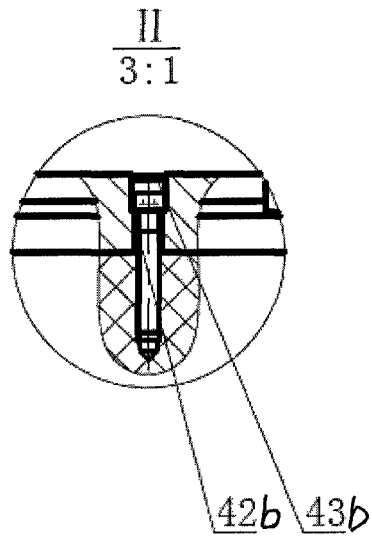
Figure 3:
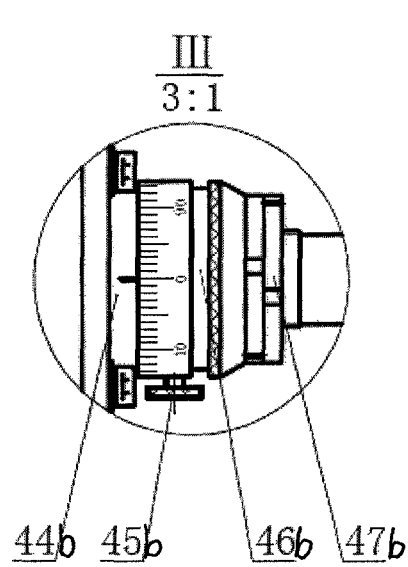
Figure 3:
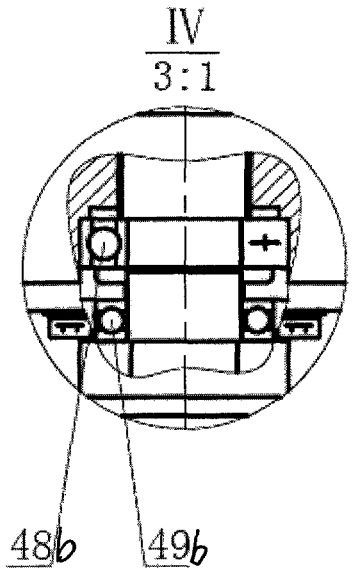

In FIG. 3:

1b-vertical base; 2b-vertical left shield; 3b-guiding rail; 4b-bracket; 5b-water catcher; 6b-horizontal base; 7b-circulation tool base plate; 8b-fixed shaft; 9b-nut seat; 10b-guiding rail slider; 11b-guiding rail; 12b-hexagon socket screw; 13b-elastic washer; 14b-washer; 15b-hexagon socket screw; 16b-vertical right shield; 17b-hexagon socket screw; 18b-elastic washer; 19b-hexagon socket screw; 20b-washer; 21b-bearing cap; 22b-back hand wheel; 23b-hexagon socket screw; 24b-elastic washer; 25b-washer; 26b-outside hex bolt; 27b-washer; 28b-capable angle iron; 29b-horizontal front shield; 30b-horizontal rear shield; 31b-hexagon socket screw; 32b-horizontal lead screw; 33b-hexagon socket screw; 34b-vertical lead screw; 35b-hexagon socket screw; 36b-elastic washer; 37b-washer; 38b-bearing housing; 39b-key; 40b-screw; 41b-gasket; 42b-hexagon socket screw; 43b-guiding rail hole cover; 45b-locking screw; 46b-scale ring; 47b-locking round nut; 48b-deep groove ball bearing; 49b-thrust bearing.

Figure 4:
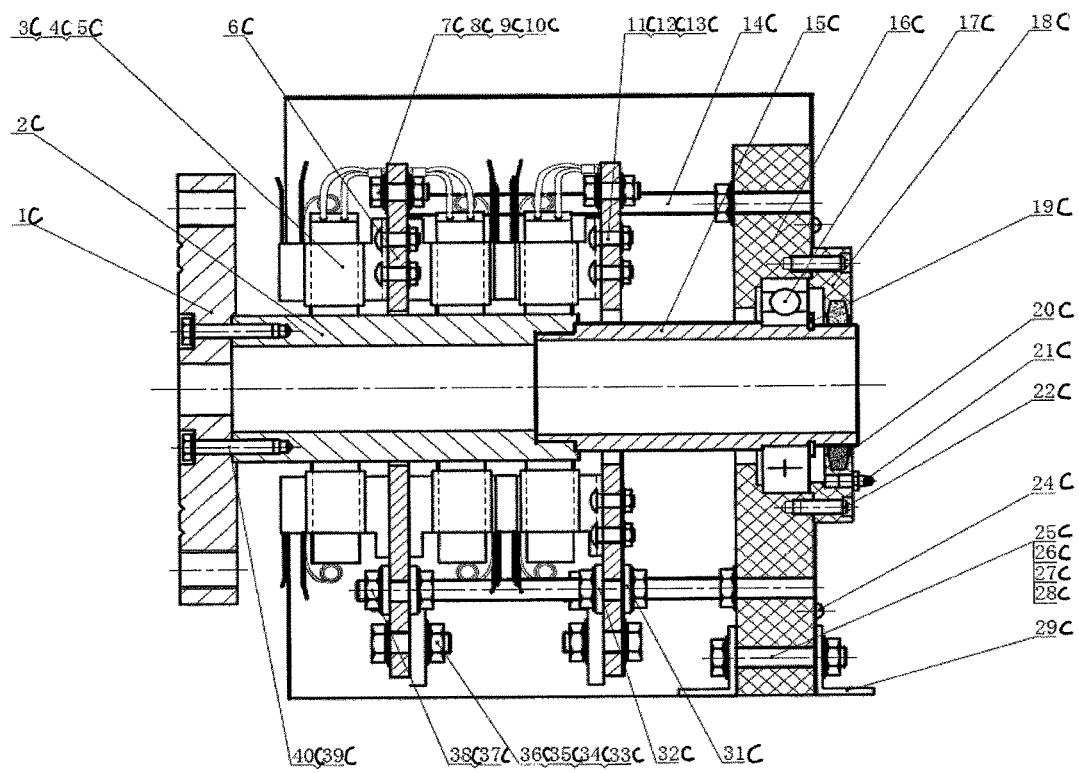
FIG. 4 is the structure diagram of anode device (DHX33A2000YD-03) in the present invention, where (a) is front view and (b) is left view.
Figure 4:
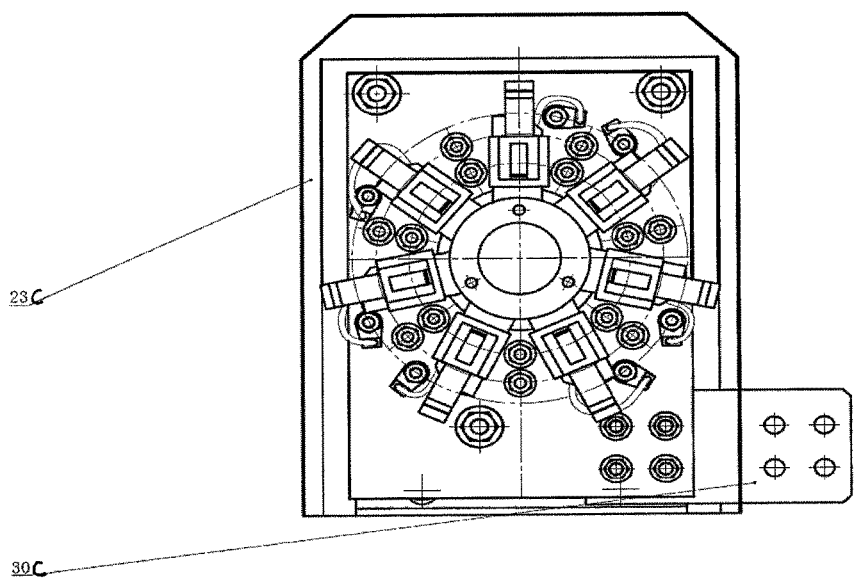

In FIG. 4:

1c-anode wiring plate; 2c-anode collecting shaft; 3c-brush; 4c-brush bracket; 5c-pressure spring; 6c-anode collector; 7c-outside hex bolt; 8c-nut; 9c-washer; 10c-elastic washer; 11c-carriage wheel screw; 12c-washer; 13c-self locking nut; 14c-lead screw; 15c-anode positioning sleeve; 16c-anode bearing housing; 17c-deep groove ball bearing; 18c-anode bearing cap; 19c-elastic collar; 20c-sealing ring; 21c-grease fitting; 22c-hexagon socket screw; 23c-anode shield; 24c-round screw; 25c-outside hex bolt; 26c-nut; 27c-washer; 28c-elastic washer; 29c-fixed angle iron; 30c-wiring plate; 31c-insulating sleeve; 32c-insulating gasket; 33c-outside hex bolt; 34c-nut; 35c-washer; 36c-elastic washer; 37c-nut; 38c-washer; 39c-fine thread of outside hex bolt; 40c-elastic washer.

In FIG. 5:

1d-chassis; 2d-wheel; 3d-adjustable horizontal arm; 4d-stand; 5d-spring; 6d-safety buckle; 7d-locking block; 8d-rope; 9d-hanging ring; 10d-nut; 11d-bracket; 12d-outside hex bolt; 13d-nut; 14d-washer; 15d-elastic washer; 16d-hand winch; 17d-outside hex bolt; 18d-nut; 19d-washer; 20d-elastic washer; 21d-anti-dust gasket; 22d-plate base chassis; 23d-pulley component; 24d-nut; 25d-thin nut; 26d-roller bracket; 27d-round screw; 28d-locating pin; 29d-legs; 30d-bearing; 31d-bearing; 32d-outside hex bolt; 33d-elastic washer; 34d-remote control box; 35d-short electric arc pneumatic circulation tool.

Figure 6:
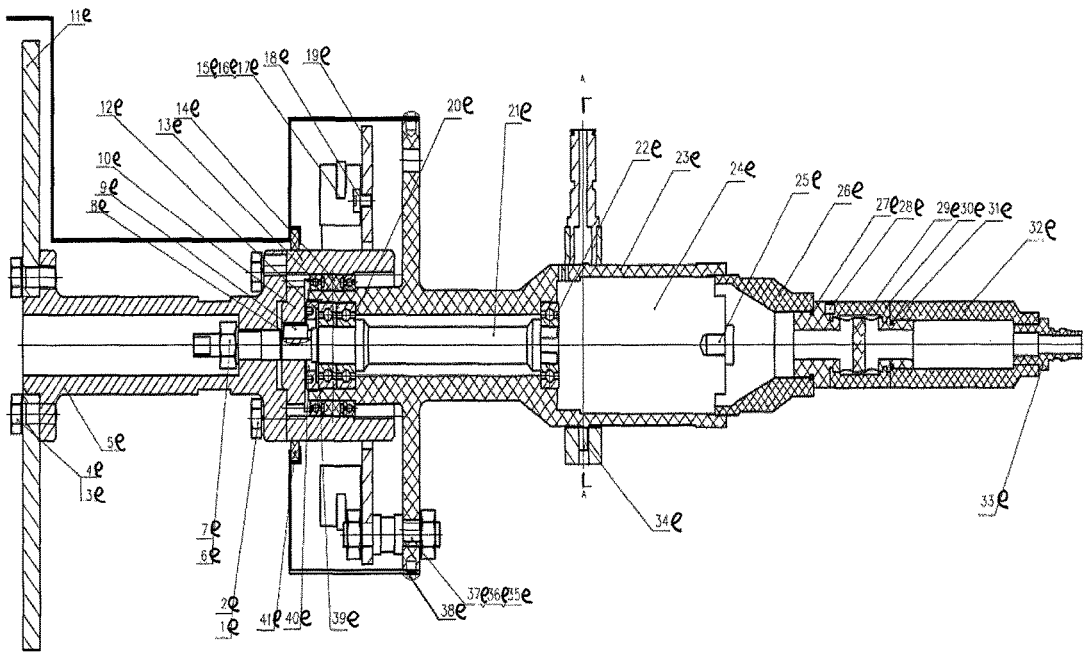
FIG. 6 is the structure diagram of pneumatic circulation tool (DHX31A2025-01) in the present invention, where (a) is the axial section view and (b) is A-A view of (a)
Figure 6:
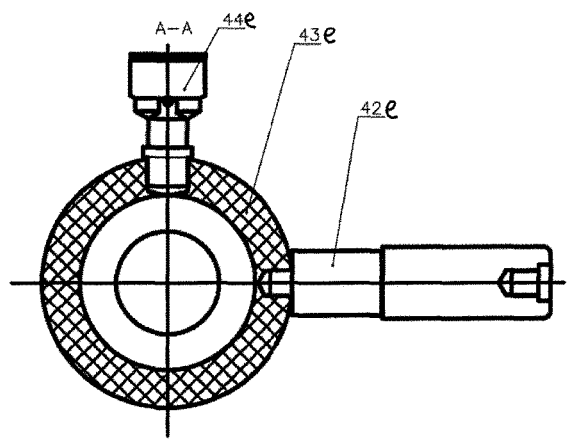

In FIG. 6:

1e-outside hex bolt; 2e-elastic washer; 3e-outside hex bolt; 4e-elastic washer; 5e-electrode mounting shaft (cast aluminum alloy); 6e-hexagon nut; 7e-elastic washer; 8e-elastic collar; 9e-key; 10e-collecting ring (anti-wear copper alloy); 11e-tool electrode; 12e-gland nut; 13e-ceramic bearing; 14e-spacer; 15e-brush; 16e-brush bracket; 17e-volute spiral spring; 18e-hexagon socket screw; 19e-collector; 20e-bearing; 21e-connecting shaft; 22e-bearing; 23e-main body; 24e-blade-type pneumatic motor; 25e-outside hex bolt left; 26e-base; 27e-O-sealing; 28e-elastic cylindrical pin opening; 29e-valve core; 30e-regulating switch; 31e-O-shaped sealing ring; 32e-handle; 33e-quick air-pipe fitting; 34e-sunk screw; 35e-hexagon nut; 36e-elastic washer; 37e-strut; 38e-round screw; 39e-elastic collar; 40e-spacer T; round steel; 41e-seal ring; 42e-handle; 43e-sealing ring; 44e-Y-shaped air-pipe fitting.

Based on FIG. 7, figure references in the implementation of the present invention are as follows:

1f-power switch; 2f-water switch; 3f-reset button

PARTICULAR EMBODIMENTS

The best implementations of the present invention are elaborated on the basis of figures. The best implementations here are used to elaborate and interpret the present invention only but not used to restrict the present invention.

According to the implementations of the present invention, a portable discharge processing system by short electric arc is provided as shown in FIG. 1 to FIG. 7.

Figure 1:
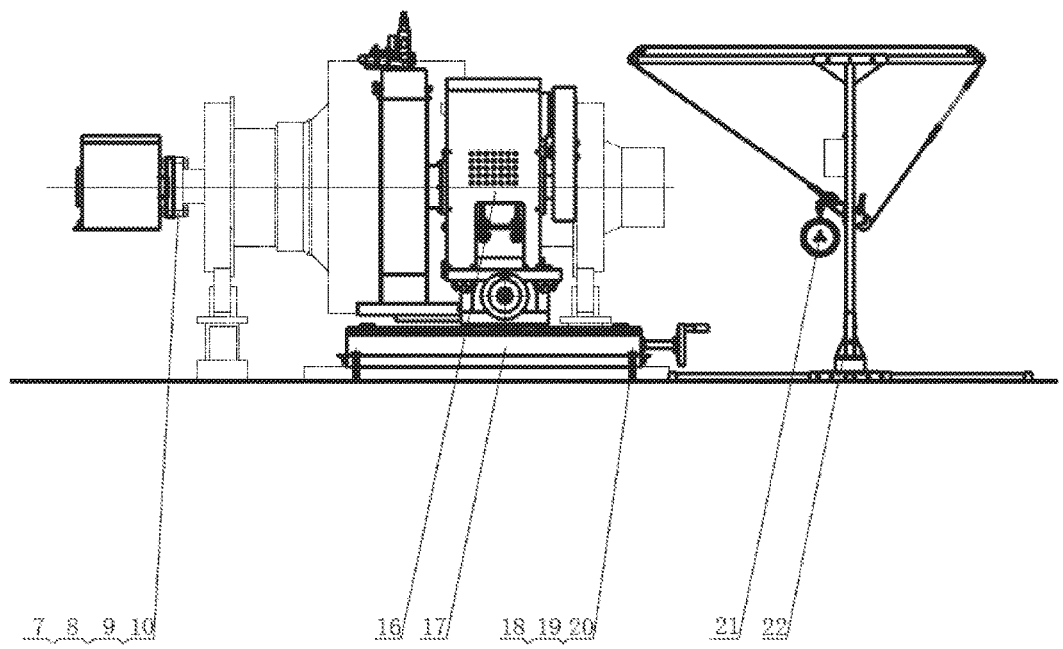
FIG. 1 is general assembly diagram of movable short-electric arc cutting device, where (a) is front view, (a-1) is the left part of view (a), (a-2) is the right part of view (a), (b) is left view and (c) is top view.
Figure 1:
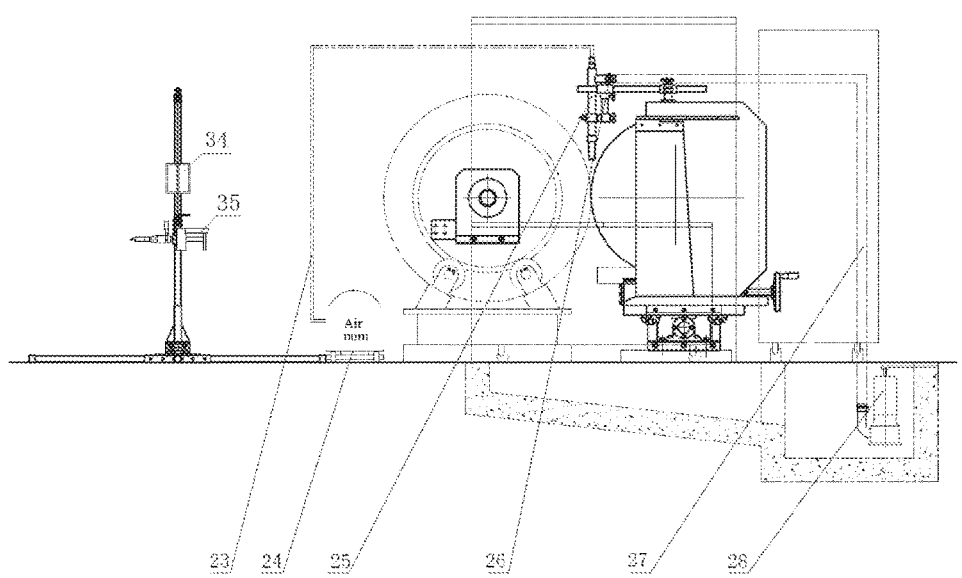
Figure 1:
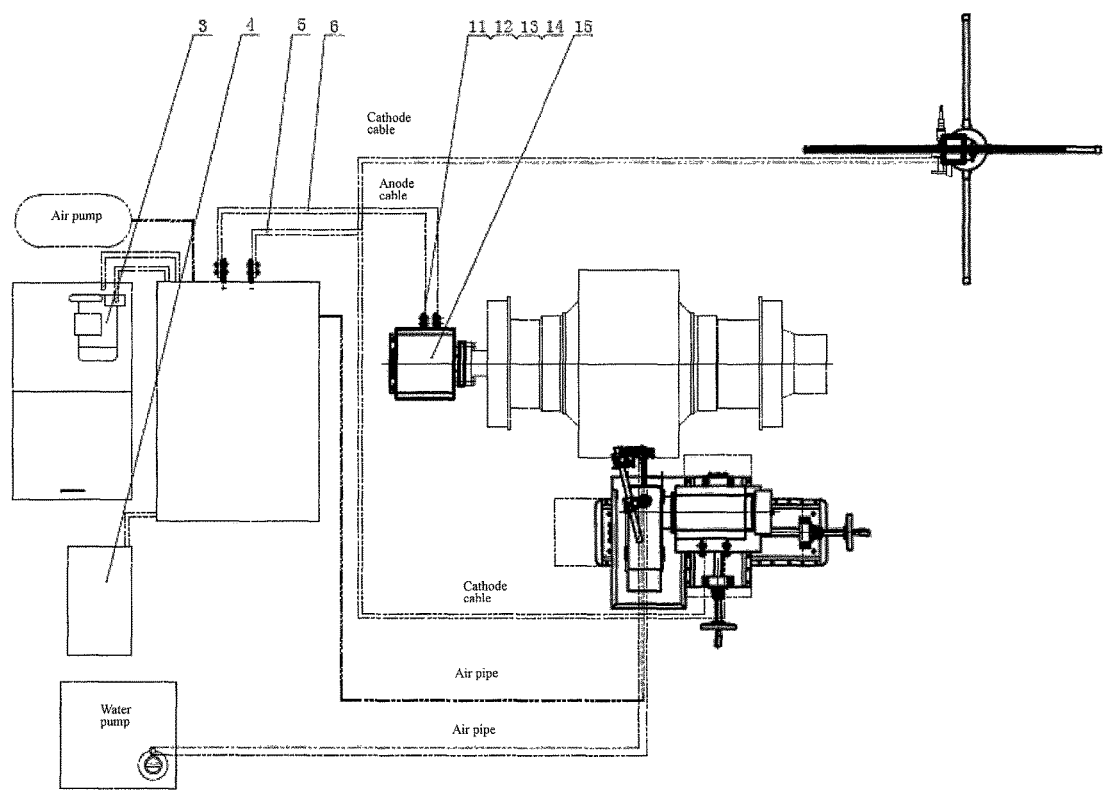

According to FIG. 1, a portable short electric arc processing system comprises a short-electric arc cutting power supply, a short-electric arc circulation tool, a control system, a water-air mixing system, an electric connection system, and a hanger. 1. A Short electric arc cutting power supply comprises a main circuit, a control circuit, a display circuit and a protection circuit.

1.1 Main Circuit:

The main circuit comprises an incoming AC voltage signal display circuit, a RC (resistance capacity) absorption circuit, a primary voltage-regulating circuit, a rectification transformer, a secondary rectification circuit, a shunting and outputting circuit, an overload signal protection and display circuit.

One ends of the main circuit AC power lines A, B and C and the neutral line N are respectively connected with AC power source. The other ends of the power lines A, B, C and the neutral line N sequentially are connected to the input terminals of an air switch ZK respectively; the output terminals of the air switch ZK are connected to the input terminals of a three-phase and five-pole transformer ZLB having six phase output terminals; each of the six phase output terminals of the five-pole transformer ZLB is connected to a terminal of one of thyristor rectifiers D1-D6 and the other terminals of the thyristor rectifiers are connected with the terminal AX of a shunt FL; the other terminal of the shunt FL outputs a negative work power voltage; the other terminals of three-phase and five-pole transformer ZLB outputs a positive work power voltage.

Six couple RC absorption modules are connected to thyristor rectifier D1-D6 in parallel to protect thyristor rectifier D1-D6; the K and G trigger control terminals of thyristor rectifier D1-D6 are respectively connected to the K and G trigger control pins of a control panel.

1.2 Control Circuit, Protection Circuit and Display Circuit:

The control circuit, protection circuit and display circuit mainly comprises CRSC070802F control panel and other electric elements, and protection circuit and display circuit are comprised in the control circuit.

The main circuit control panel is the type of CTSC070802F and the pins on the left side of the control panel are: AC20V, 0V, AC16V, GND, 0V, AC9V, A, B, C, IA, IB, IC, ID, VA, VB, VC, GND, WK1, WK2, +5V, GND1, XSA, GND, +5V, GND, XSA, GND, +12V, GND, −12V, GND, +5V and GND.

The pins in the bottom of the control panel CTSC070802F are: CV, CC, V−, +V, AX, UX, GND, GND, AK and CT.

The pins on the right side of the control panel CTSC070802F from top to the bottom are: eight couples of G and K pins, used to control thyristors.

The pins on the left side of the control panel CTA08021 are: V, −IR, GND, GND, AC15V, AC15, GND, GND, AC7V and AC7V.

The pins on the right side of the control panel CTA08021 are: V, I, GND, GND, +5V and 0V.

The input voltage of the power source is 220V and the input terminals are LC and N, the output terminals are 12V and GND. The output terminals supply power for the coils of the four relays J1, J2, J3 and J4, so that the relays can work.

The pins on the top of the control panel IGJ-75mv are: IF, GND and CT the normally open contacts.

The pins on the bottom of the control panel IGJ-75mv are: AC15V and AC 15V.

The pins on the left side of the phase-sequence and default-phase protector are: A, B and C.

The pins on the top of the phase-sequence and default-phase protector are: four pins or two couple couples of normally open contacts.

Each of the Relays J1, J2, J3 and J4 has eight or four couples of normally open contacts couple used for switching and controlling power lines.

Relay J1 has four couples of or eight contacts from left to right. The Input terminals of the first couple are connected to the LC reset, the left terminal of the output terminals is connected to the local LC reset and the right terminal is connected to the remote LC reset; the input terminals of the second couple are connected to the CT and connected to the point A of the transformer, the left terminal of output terminals is connected to the local LC reset and the right terminal is connected to the remote LC reset; the third couple is idle or open; the input terminal of the fourth couple is connected to CV and connected to the pin CV on the bottom of the control panel CTSC070802F, the left terminal of the output terminals is connected to the local CV and the right terminal is connected to the remote CV.

Relay J2 has four couples of or eight contacts from left to right. The input terminal of the first couple is connected to GNDU and connected to the pin GND on the bottom of the control panel CTSC070802F, the left terminal of the output terminal is connected to the top of GNDU at the output terminal of power source and the right terminal is connected to the top of the remote GNDU; the input terminal of the second couple is connected to CT and connected to point A of the transformer, the left terminal of the output terminals is connected to the local CT reset and the right terminal is connected to the remote CT reset; the third couple is idle; the input terminals of the fourth couple are connected to the CV and connected to the pin CV on the bottom of the control panel CTSC070802F, the left terminal of the output terminals is connected to the local CV and the right terminal is connected to the remote CV.

Relay J3 has four couples of or eight contacts from left to right. The Input terminals of the first couple is connected to the water valve 380C2 and the input terminals of the four couples are connected to the water valve 380C2, the water valve 380VC, the air valve 220VL and the air valve 220L2 in parallel, the left terminal of the output terminal is connected to the water valve 380VC and connected to a second couple of water valve 380VC in parallel and the right terminal is connected to remote LC reset; the input terminals of the second couple are connected to CT and connected to point A of the transformer, the left terminal of the output terminals is connected to local CT reset and right the terminal is connected to remote CT reset; the third couple is idle; the input terminals of the fourth couple are connected to CV and connected to the pin CV on the bottom of the control panel CTSC070802F, the left terminal of the output terminals is connected to local CV and the right terminal is connected to remote CV.

Relay J4 has four couples of or eight contacts from left to right. The first couple, second couple and third couple are idle. The Input terminals of the fourth couple are connected to 75mvJ and connected to pin CT on the bottom of the control panel CTSC070802F and the left terminal of the output terminals is connected to the upper terminal of the water flow switch CT and the right terminal is idle.

The Six input terminals are successively from left to right connected to: remote LC reset, remote LC reset, remote water valve 380VC, remote water valve 380VC2, remote air valve 220VL and remote air valve 220VN;

The Six output terminals are successively from left to right connected as follows: the output terminals of remote LC resets are respectively connected to the two terminals of the reset switch to form a circuit; the output terminals of remote water valves 380VC and 380VC2 are respectively connected to the terminals of the water switch to form a circuit; the output terminals of the remote air valves 220VL and 220VN are respectively connected to the two terminals of the air switch to form a circuit.

Figure 7:
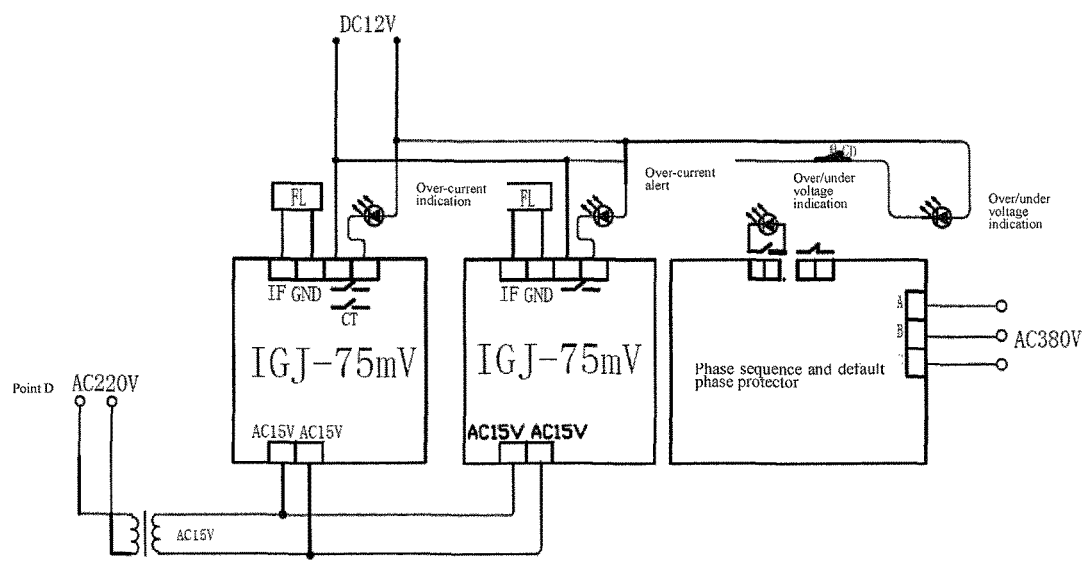
FIG. 7 is electric principle diagram of the short-electric arc cutting power supply in the present invention, where (a) is an over-current wiring diagram, (b) is a relay power supply wiring diagram, (c) is a digital enlarged wiring diagram, (d) is a water wiring diagram, (e) is DHX31A3000A/28V wiring diagram and (f) is a partially enlarged diagram of RC module in (e).
Figure 7:
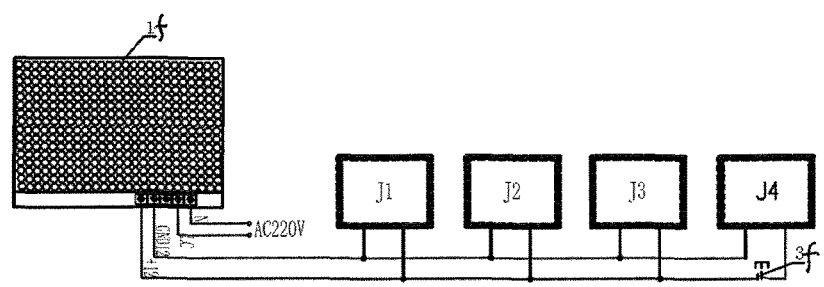
Figure 7:
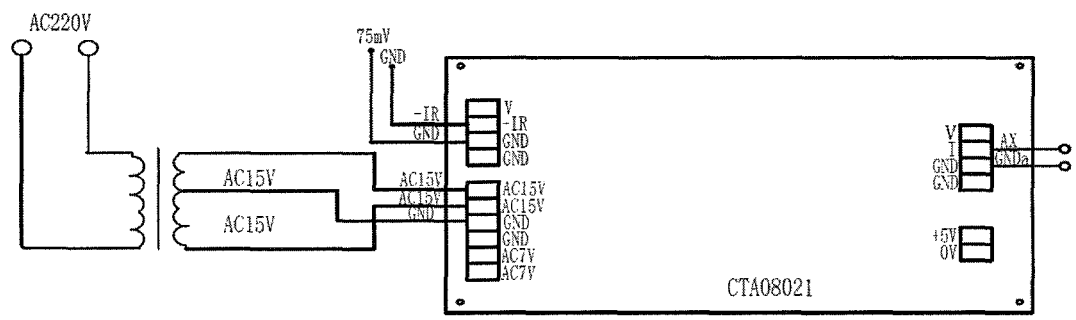
Figure 7:
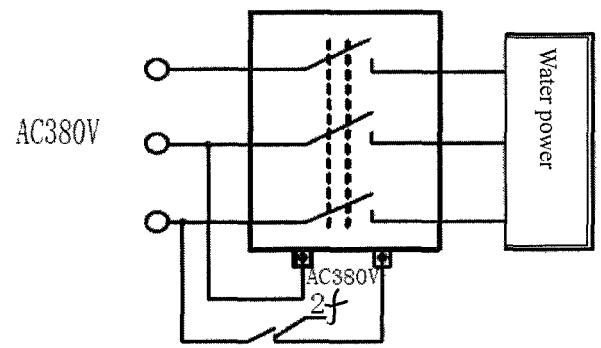
Figure 7E:
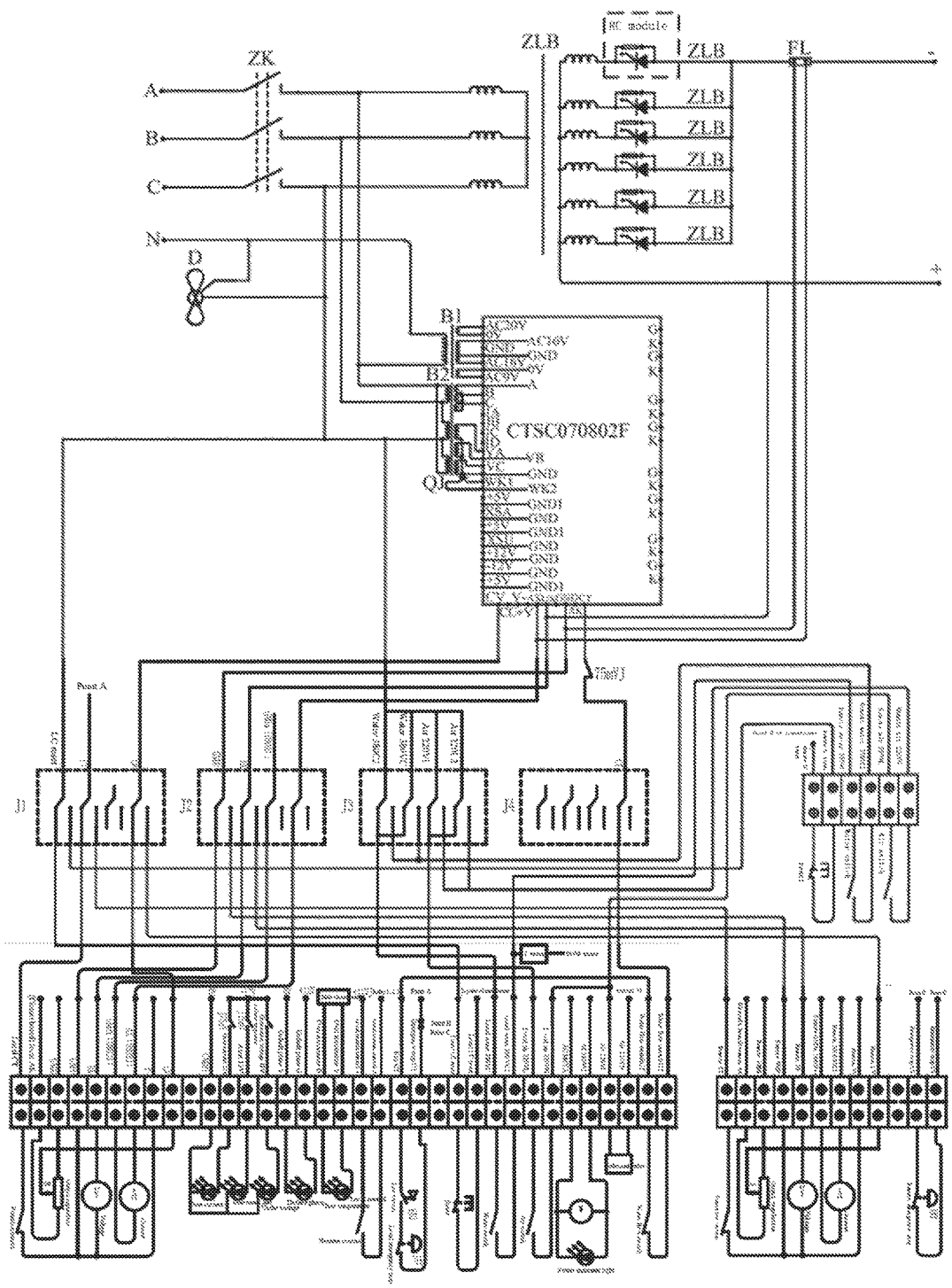
Figure 7F:
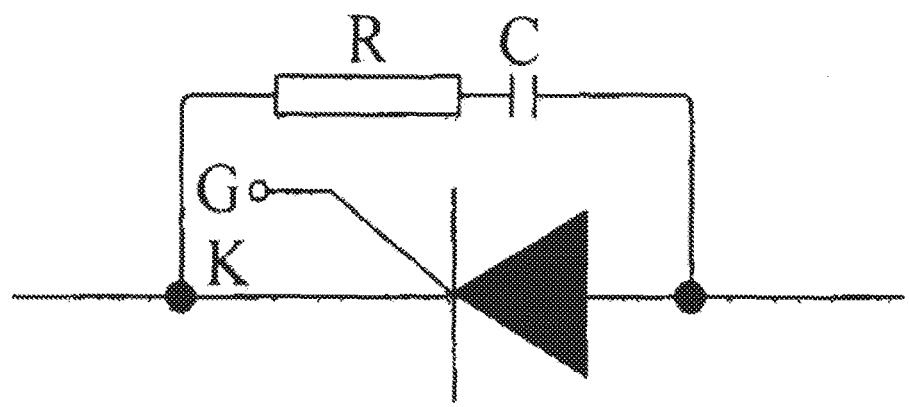

As shown in FIG. 7, the power output terminals are respectively from left to right connected to: local CT, (circuit board) local AK, GND0, GNDU, UX, GNDa (08021), AX (08021), V−, CV, an idle couple of terminals, GND light, J75mv over-current 12V, J75mv alertalert 12V, J phase-sequence over/under voltage 12V, default phase V, default phase over temperature over temperature V, local/remote control 1, local/remote control 2, key CT, emergency stop CT, an idle couple of terminals, local LC reset, local LC reset, local water valve 380VC, local water valve 380VC2, local air valve 220VL, local air valves 220VN, AC 380VA, AC380VC, air valve 220VL, air valve 220VN, water flow switch CT, water flow switch VC, another terminal remote CT, (circuit board) remote AK, remote GND0, remote GNDU, remote UX, remote GNDa (08021), remote AX (08021), remote V−, remote CV, an idle couple of terminals, emergency stop CT and emergency stop CT. FIG. 7 shows switch power 1f, water switch 2f and reset button 3f.

"Local" refers to LC (local control) and remote refers to RC (remote control), representing different control terminals and control modes.

The terminals are respectively from left to right connected as follows:

One of the output terminals of the Local CT is connected to one terminal of a function output switch and the other terminal of the function output switch is connected to outgoing terminal of GNDU, one terminal of voltmeter connected to UX outgoing terminal and V− outgoing terminal, terminal A of ampere meter is connected to outgoing terminal of GNDa (08021) and the other terminal is connected to the outgoing terminal of AX (08021).

(Circuit board) local AK outgoing terminal is connected to the fixed output regulating terminal of potentiometer W, outgoing terminal of GND0 is connected to the other output regulating terminal of potentiometer W, CV outgoing terminal is connected to the output regulating terminal of potentiometer W.

The outgoing terminal of GND light is respectively connected to one terminal of over-current indicator light, over-current alertalert light and under-voltage indicator light, the other terminal of over-current indicator light is connected to J75mv over-current 12V outgoing terminal, the other terminal of over-current alert light is connected to outgoing terminal of J75mv alertalert 12V, the other terminal of under-voltage indicator light is connected to outgoing terminal of J phase-sequence over/under voltage 12V.

One terminal of default-phase indicator light is connected to outgoing terminal of default phase V and the other terminal is connected to outgoing terminal of default phase G One terminal of over-temperature G outgoing terminal and the other terminal is connected to over-temperature V outgoing terminal.

Local control terminal of local control and remote control of the switch is connected to outgoing terminal of a first local/remote control and remote control terminal of local control and remote control of the switch is connected to outgoing terminal of a second local/remote control.

Outgoing terminal of key CT is connected to one terminal of key switch YAQ, the other terminal of key switch YAQ is connected local control emergency stop button JAT in series and the other terminal of emergency stop bottom JAT of local control is connected to outgoing terminal of emergency stop CT.

One terminal of reset button is connected to outgoing terminal of local LC reset and the other terminal is connected to the outgoing terminal of local LC reset.

One terminal of water switch is connected to outgoing terminal of water 380VC and the other terminal is connected to outgoing terminal of local water 380VC2.

One terminal of air switch is connected to outgoing terminal of local air 220VL and the other terminal is connected to outgoing terminal of 220VN.

One terminal of power input voltmeter is connected AC380VA outgoing terminal and the other terminal is connected to AC380VC outgoing terminal. Meanwhile, power input voltmeter V is connected to power indicator light in parallel to indicate whether the power is electrified.

One terminal of solenoid valve is connected to air 220VL outgoing terminal and the other terminal is connected to 220VN outgoing terminal to control the air.

One terminal of water flow switch is connected to water flow switch CT outgoing terminal and the other terminal is connected to CT outgoing terminal of another water flow switch.

Remote Control Line is:

Remote CT outgoing terminal is connected to normally open contact of function output switch and the other terminal of normally open contact is connected to remote GNDU outgoing terminal, one terminal of voltmeter connected to remote UX outgoing terminal and remote V– outgoing terminal, one terminal of ampere meter is connected to remote GNDa (08021) outgoing terminal and the other terminal is connected to remote AX (08021) outgoing terminal.

(Circuit board) remote AK outgoing terminal is connected to the fixed output regulating terminal of potentiometer W, outgoing terminal of remote GND0 is connected to the other output regulating terminal of potentiometer W and remote CV outgoing terminal is connected to the output regulating terminal of potentiometer W.

Outgoing terminal of emergency stop CT connected to point B of transformer is connected to one terminal of RC emergency stop button JAT and the other terminal of RC emergency stop button JAT is connected toe outgoing terminal of emergency stop CT connected to transformer C.

Purposes of terminals and numbers that are not used in the control panel are not considered and are not included in the protection scope of the present invention.

3. A Pneumatic Circulation Tool for a Short Electric Arc Process:

The Pneumatic circulation tool comprises a portable pneumatic circulation tool or a movable light cathode device.

A portable pneumatic circulation tool:

A user can hold such a portable pneumatic circulation tool to process and finish a conductive hard material. This circulation tool comprises a pneumatic device, an electric charging device, an electric arc device and an air-liquid mixing device.

As shown in FIG. 6, the technical features of the circulation tool are as follows: a tool electrode $11e$ is fixed to an electrode mounting shaft $5e$ by means of bolts $3e$ and elastic washers $4e$; the electrode mounting shaft $5e$ is mounted to an electric collecting ring $10e$ by means of fine-thread bolts $1e$ and elastic washers $2e$, while an axial hole of the electrode mounting shaft $5e$ is coupled solidly to the connecting shaft $26e$ by means of a nut $6e$ and an elastic washer $7e$ to make sure that the electrode mounting shaft $5e$, the electric collecting ring $10e$ and the connecting shaft $21e$ are co-axial so as to prevent any eccentric movement or vibration caused as the tool electrode $11e$, the electrode mounting shaft $5e$, the electric collecting ring $10e$ and the connecting shaft $21e$ rotates and to prevent the two high-temperature resistant ceramic or plastic bearings $13e$ and the bearing $20e$ from a fast damage; the two high-temperature resistant ceramic or plastic bearings $13e$ are mounted on the left end portion of the main body $22e$ and the two high-temperature resistant ceramic or plastic bearings $13e$ are separated by a spacer $14e$, the left end portion of the main body $22e$ has a radial shoulder and a distal end portion for passing and holding the inner racers of the two high-temperature resistant ceramic or plastic bearings $13e$ while a pressure nut $12e$ is used for fixation to prevent the two bearings $20e$ from slipping off the left end portion of the main body $22e$; the nut $6e$ and the elastic washer $7e$ are pressed on the axial hole of the electrode mounting shaft $5e$ to prevent the electrode mounting shaft $5e$ and the electric collecting ring $10e$ from slipping off the connecting shaft $21e$.

The electric collecting ring $10e$ is fixed on the connecting shaft $21e$ by means of a key $9e$, and has a bigger hole on the left side fit on the outer racers of the two high-temperature resistant ceramic or plastic bearings $13e$; an elastic collar $8$ is mounted on the connecting shaft $26e$ against the left side of the collecting ring $10e$ to prevent the electric collecting ring $10e$ from slipping off the connecting shaft $21e$.

The right end portion of the connecting shaft $21e$ is mounted rotatably on the a bearing housing $22e$ of the main body $23e$ via the inner racer of a bearing $22e$, while the left portion of the connecting shaft $21e$ is mounted on the left portion of the main body $23e$ rotatably by means of the inner racers of the two plastic bearings $20e$; the right portion of connecting shaft $21e$ is male-female coupled to a blade-type pneumatic motor $24e$, the blade-type pneumatic motor $24e$ has an eccentric cylinder mounted in an internal cavity of the main body $23e$, while the blade-type pneumatic motor $24e$ is held concentrically to the internal hole of the main body $23e$ and the connecting shaft $21e$ without significant errors.

A base $26e$ has a threaded left portion coupled to the inner threaded right portion of the main body $23e$ so as to mount the blade-type pneumatic motor $23e$ tightly into the eccentric cavity of main body $23e$; wrench seats are formed on the left portion of the main body 23e and the right portion of the base 26e for screwing the main body 23e and the base 26e up tightly.

A valve core 29e has a threaded left portion coupled to the innerly threaded right portion of the base 25e and an O-shaped ring is mounted in a sealing groove formed in the left portion of valve core 29e; the valve core 29e has a position-limiting cylindrical pin 27e for limiting the degree of the rotation of the regulation switch 30e; two slots are formed into the regulating switch 30e to control an air inlet volume and are long enough to cover two radial air holes. It's important to explain that the horizontal hole in the right portion of the valve core 29e is open to the right radial air hole and to an air inlet end; the horizontal hole in the left portion of the valve core 29e is open to the left radial air hole and to the pneumatic motor 24e so that the regulating switch 30e can regulate the air inlet volume and the motor speed.

A cylindrically hollow insulating handle 31e has a threaded left end portion engaged to the outer thread of the right portion of the valve core 29e and an O-shaped sealing 31e is mounted in a sealing groove formed in the right portion of the valve core 29e.

A quick air-pipe fitting 33e has a threaded left end portion fit to the inner thread of the right portion of a handle 32e and the right end of the quick fitting 32e is connected to a quick fitting to a compressed air source. When the air source is turned on, the regulating switch 30e can be adjusted to accelerate, decelerate or stop the tool electrode 11e.

A sealing ring 43e is mounted over an outlet formed in the left portion of the main body 23e and fastened by bolts 34e. The internal curve surface of the sealing ring 43e is sealed over the main body 23e by an adhesive; an insulating handle 42e is mounted on the sealing ring 43e and a Y-shaped quick fitting 44e is mounted on the sealing ring 43e and another Y-shaped quick fitting 44e conveys a secondary or used air discharged through an air pipe to another Y-shaped quick fitting 46e to a water-air mixer 45e; a water-air nipple 48e is used to provide a working medium for a water-air mixture to recycle the used air; a water is distributed to the Y-shaped quick fitting 46e into the water-air mixer by means of a T-shaped quick fitting 45e, the quick fitting 46e and the water-air mixer 48e are connected by a threaded sleeve 47e. The inlet water volume can be adjusted by a control valve if necessary. The water can be provided by a water pup, come from a tap water or sucked by a vacuum generated by a compressed air running through the water-air mixer 48e.

The right ends of three regularly arranged struts 37e are fixed on a flange of the main body 23e by means of nuts 34e and the other end (left end) is mounted on an electric collector 19e by means of nuts 35e; the collector plate 19e is mounted with a brush 15e and a brush bracket 16e and a pressure spring 17e; the brush bracket and spring 16e and 17e are fixed to the collector 19e by means of a bolt 18e and each brush 15e is connected to the collector 19e through a copper wire; each brush 15e is pressed against the electric collecting ring 10e by means of the brush bracket and the pressure spring so the collecting ring 10e is charged rotatably; the collector 19e can be connected to the positive pole of the short electric arc power supply via a bolt 50e, a nut 51e, an elastic washer 52e, a gasket 53e through a cable.

One end of a shield 49e is fixed to the flange of the main body 23e by means of three screws 38e and the other end side is set to shield the tool electrode 11e from the splashing of a short electric arc processing, in order to protect operators during operation. A sealing ring 41e is mounted in the middle portion of the shield 49e to prevent the collecting ring 10e and the brush 15e, the brush bracket and spring 16e and 17e and the collector 19e from contamination.

The tool electrode 11e of the circulation tool can be replaced with a grinding wheel for direct mechanical cleaning. The tool electrode 11e may be made from any conductive materials.

The main body 23e, the base 26e, the valve core 29e, the regulating switch 30e and the handle 32e of the circulation tool is coated with a 0.5 mm-1 mm thick high-voltage insulating material. A weight bracket 54e is mounted on the left portion of circulation tool. The weight bracket 54e is used for a ballance weight when the circulation tool is overweight. The main body 23e, the base 26e, the valve core 29e, the regulating switch 30 and the handle 32e of the circulation tool may be made from various light insulating plastics, fiberglass, PVC materials or high-strength insulating ceramics.

In FIG. 6, outside hex bolt 1e, elastic washer 2e, outside hex bolt 3e, elastic washer 4e, electrode mounting shaft 5e, hexagon nut 6e, elastic washer 7e, elastic collar 8e, key 9e, collecting ring 10e, tool electrode 11e, gland nut 12e, ceramic bearing 13e, spacer 14e, brush 15e, brush bracket 16e; volute spiral spring 17e, inner hexagon screw 18e, collector 19e, bearing 20e, connecting shaft 21e, bearing 22e, main body 23e, blade-type pneumatic motor 24e, outside hex bolt 25e, the base 26e, 0-shaped sealing ring 27e, elastic cylindrical pin 28e, valve core 29e, regulating switch 30e, 0-shaped sealing ring 31e, handle 32, quick air-pipe fitting 33e, sunk bolt 34e, hexagon nut 35e, elastic washer 36e, strut 37e, bolt 38e, elastic collar 39e, spacer 40e, sealing ring 41e, handle 42e, sealing ring 43e, Y-shaped two-way air pipe fitting 44e, water-air mixer 45e, Y-shaped quick fitting 46e, thread sleeve 47e, water-air mixer 48e, shield 49e, bolt 50e, nut 51e, elastic washer 52e, gasket 53e and hanging bracket 54e.

4. Movable Light Cathode Device for a Short-Electric Arc Process

Movable Light Cathode Device Comprises a Movable Short-Electric Arc Cutting Device:

In FIG. 1, it comprises cooling water tank 1, a short electric arc cutting power supply 2, sucking pump 3, a control cabinet 4, a cathode cable 5, a cathode cable 6, outside hex bolt 7, nut 8, elastic washer 9, washer 10, outside hex bolt 11, nut 12, elastic washer 13, washer 14, anode device 15, circulation device 16, feeding mechanism 17, outside hex bolt 18, elastic washer 19, washer 20, air pipe 21, air compressor 22, water-air system 23, water pipe clamp 24, water pipe 25 and draining pump 26.

The Circulation Device

Figure 2:
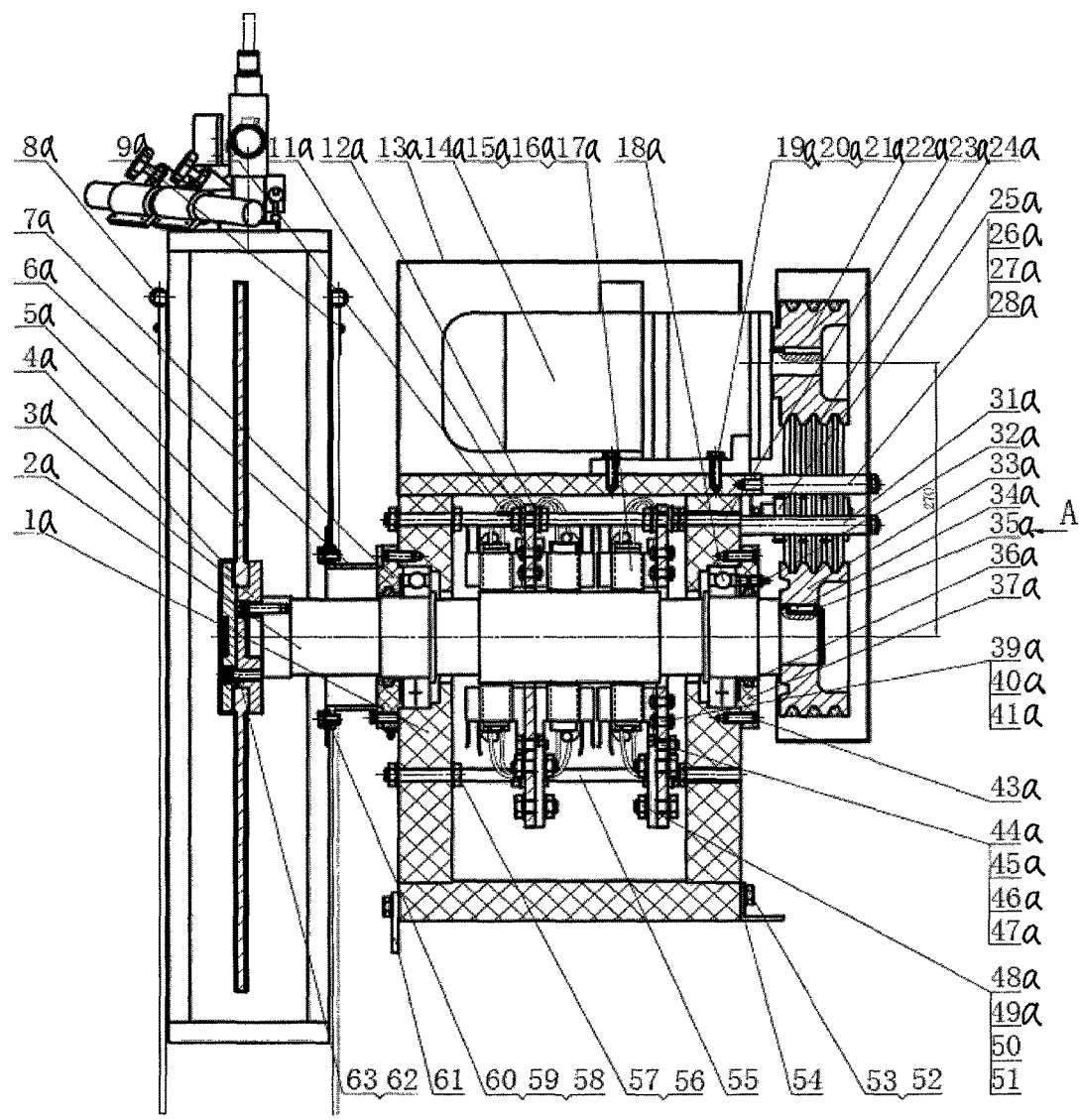
FIG. 2 is the structure diagram of circulation device (DHX33A2000YD-01) in the present invention, where (a) is a part sectioned view of frontview, (b) is the structure diagram in A direction of (a)
Figure 2:
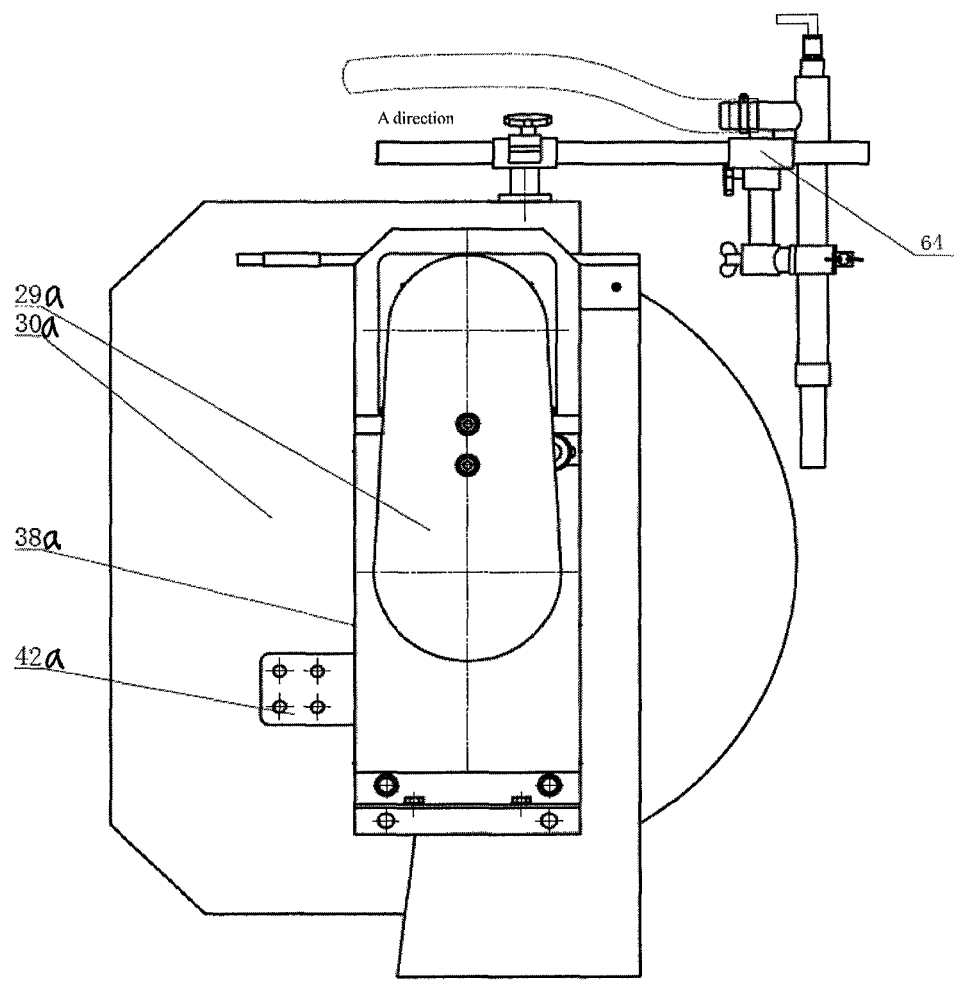

As shown In FIG. 2, it comprises cathode base 1a, main cathode shaft 2a, fixed based of tool electrode 3a, pressure plate of tool electrode 4a, tool electrode 5a, fixed base of shield 6a, front bearing cap 7a, left water block board assembly 8a, right water block board assembly 9a, collector 10a, insulating sleeve 11a, insulating gasket 12a, cathode shield 13a, gear motor 14a, brush 15a, brush bracket 16a, pressure spring 17a, bearing 18a, elastic washer 19a, washer 20a, outside hex bolt 21a, motor belt pulley 22a, lead screw 23a, V-shaped belt 24a, tensile pulley 25a, strut 26a, washer 27a, nut 28a, belt pulley bearing 29a, tool electrode shield 30a, strut I 31a, grease fitting 32a, belt pulley of main shaft 33a, key 34a, elastic collar 35a, sealing ring 36a, rear bearing cap 37a, round screw 38a, carriage wheel screw 39a, washer 40a, self-locking nut 41a, wiring plate 42a, hexagon socket screw 43a, outside hex bolt 44a, nut 45a, washer 46a, elastic washer 47a, outside hex bolt 48a, nut 49a, washer 50, elastic washer 51, outside hex bolt 52, washer 53, connecting angle iron 54, lead screw 55, nut 56, washer 57, outside hex bolt 58, elastic washer 59, washer 60, connecting plate 61, hexagon socket screw 62 and elastic washer 63.

The circulation device has the following features: a main cathode shaft 2a mounted on an insulating cathode base 1a rotatably by means of front bearing and rear bearings 18a, a front bearing cap 7a is mounted on the front end of the cathode base 1a and in front of the bearing 18a, and the rear bearing cap 37a is mounted on the rear end of the cathode base 1a and behind the rear bearing 18a by means of hexagon socket screws 43a. A filling channel and a grease fitting 32a are formed through the front bearing cap 7a for a grease lubrication of the front bearing 18a; a trapezoidal groove is formed in the front bearing cap 13a, and a wool ring 7a is mounted therein to prevent the lubricating grease from leaking from between the main cathode shaft 2a and the front bearing cap 7a; a filling channel and a grease fitting 32a are formed in the rear bearing cap 37a for a grease lubrication of the rear bearing 18a; a wool O-ring is mounted in a trapezoidal groove formed in the rear bearing cap 37a or in the main cathode shaft 2a to shield the rear bearing.

A shield bracket 6a is mounted on the front bearing cap 7a and the shield bracket 6a is mounted on the front bearing cap 7a by means of sunk screws, a flange 6a is mounted to the left distal end of the shield bracket 6a by means of bolts, a cathode shield 13a is mounted on the left distal end of flange 6a by means of outside hex bolts 58a, elastic washers 59a and washers 60a, a water-air mixing device is mounted on the cathode shield 13a, which can be adjusted upwards, downwards, forwards and backwards as desired.

A tool electrode 1a is mounted to the left distal end of the main cathode shaft 2a, a tool electrode base 3a is mounted at the left distal end of the main cathode shaft 2a by means of regularly arranged bolts, a pressure plate 4a, through hexagon socket screws 62a and elastic washers 63a, realizes a synchronous rotation of the tool electrode base 3a, the tool electrode 5a and the main cathode shaft 2a, wherein the tool electrode 5a is fixedly connected to the left distal end of the tool electrode base 3a.

A gear motor 14a is mounted to the cathode base 1a by means of elastic washers 19a, washers 20a and outside hex bolts 21a, two struts 26a are mounted in the right end portion of the cathode base 1a by means of threads, a belt pulley bearing 29a is mounted on the two struts 26a, the belt pulley bearing 29a is fixed to the two struts 26a by means of nuts, a tensile wheel 25a is mounted under the belt pulley bearing 29a to the right end portion of the cathode base 1a by means of a bolt to regulate the tension of V-shaped belt 24a and to realize a solid transmission. A Cathode shield 13a is mounted over the cathode base 1a by means of screws, washers and elastic washers, to prevent water and dirt from damaging the parts in the cathode shield 13a. At the same time, this can prevent dirt from causing detrimental damages to the gear motor 14a so that long term normal operation is guaranteed.

Electric Collectors 10a are mounted between the front bearings and the rear bearings of the cathode base 1a. The Number of the collector 10a may be selected as desired. There are two collectors 10a in the figure. Brush components (brush 15a, brush bracket 16a and pressure spring 17a) are evenly mounted on the collector 10a and the number of the brush components (brush 15a, brush bracket 16a and pressure spring 17a) shall be determined as desired. Three lead screws 23a are mounted to the two collectors 10a and the two cathode collectors 10a are set in parallel and three lead screws 23a are mounted to the two collectors 10a in an insulating way by means of an insulating sleeve 11a and an insulating gasket 12a (see the figure) by nuts; meanwhile, the collectors 10a must be mounted vertically to the central line of the main cathode shaft 2a and at the middle portion of the main cathode shaft 2a, specifically a wear—resistant copper alloy is cast on the main cathode shaft 2a so that the brushes on the brush components (brush 15, brush bracket 16 and pressure spring 17a) are evenly distributed on the shaft surface of the main cathode shaft 2a and realize the rotation and conduction functions of the main cathode shaft 2a. The brush components (brush 15a, brush bracket 16a and pressure spring 17a) use constant pressure springs. The lines of the brushes of each brush component (brush 15a, brush bracket 16a and pressure spring 17a) are connected to the collector 10a by means of outside hex bolts 44a, nuts 45a, washers 46a and elastic washers 47a to guarantee excellent connectivity and realize reliable electric connection.

One end of a cathode cable is cramped on a wiring plate 42a of the circulation device by means of a bolt, a nut, an elastic washer and a washer, the wiring plate 42a is connected to the electric collectors 10a by means of bolts, nuts, elastic washers and washers; the other end of the cathode cable is connected to a short electric arc power.

The motor belt pulley 65a is mounted on the main output shaft of the variable-frequency motor 51a by means of a key 63a, and the motor belt pulley 65a is connected to a driven belt pulley 33a by means of V-shaped belts 64a. The adjustable variable-frequency motor 51a drives the main cathode shaft 11a and the tool electrode 1a for a short electric arc processing of a work piece.

Cathode base 1a is mounted on a base plate 7a of the circulation tool by means of outside hex bolts 52, washers 53 and L-sectioned steel 54. It can move with base plate 7a of circulation tool.

Feeding Mechanism:

In FIG. 3, longitudinally movable base 1b, longitudinally left shield 2b, railway 3b, bracket 4b, water catcher 5b, horizontal base 6b, base plate 7b of circulation tool, fixed shaft 8b, longitudinally movable nut seat 9b, guiding rail slider 10b, railway 11b, hexagon socket screw 12b, elastic washer 13b, washer 14b, hexagon socket screw 15b, longitudinally movable right shield 16b, hexagon socket screw 17b, elastic washer 18b, hexagon socket screw 19b, washer 20b, bearing cap 21b, back hand wheel 22b, hexagon socket screw 23b, elastic washer 24b, washer 25b, outside hex bolt 26b, washer 27b, capable angle iron 28b, horizontal front shield 29b, horizontal rear shield 30b, hexagon socket screw 31b, horizontal lead screw 32b, hexagon socket screw 33b, longitudinally movable lead screw 34b, hexagon socket screw 35b, elastic washer 36b, washer 37b, bearing housing 38b, key 39b, screw 40b, gasket 41b, hexagon socket screw 42b, guiding rail hole cover 43b, scale bearing cap 44b, locking screw 45b, scale ring 46b, locking round nut 47b, bearing 48b and thrust bearing 49b.

Longitudinal feeding mechanism mainly comprises: longitudinally movable base 1b, longitudinal left shield 2b, railway 3b (two rails and four rail sliders 10b), nut seat 9b, longitudinal right shield 16b, back hand wheel 22b, longitudinal lead screw 34b, longitudinal bearing housings 38b (two seats), scaled bearing cap 44b, locking screw 45b, scaled ring 46b, locking round nut 47b, bearing 48b and thrust bearing 49b.

The Railway 3b is mounted on a longitudinally movable base 1b by means of a hexagon socket screw 17b and an elastic washer 18b and has four rail sliders 10b connected to an insulating base plate 7b of the circulation tool by means of bolts. The railway 3b has two opposite end portions protruding over the hexagon bolt 17b and the elastic washer 18b for a position-limiting.

A back hand wheel 22b is connected to the right end portion of the longitudinal lead screw 34b by means of a key, two bearing housing seats 38b are mounted on a machined surface of the longitudinally movable base 1b by means of bolts. Two bearings 48b are mounted in bearing the housing 38 and a bearing cap 21b is mounted against each of the bearing housings to fix the bearings, the left end portion of the longitudinal lead screw 34b is mounted on two the ball bearings 48 inside the bearing cap 21b for a free rotation. A Longitudinal nut seat 9b is mounted on the longitudinal lead screw 17b and the longitudinally movable nut seat 9b is mounted on the bottom of a transverse base 6b by means of bolt 31b. A longitudinal back-forth feeding motion can be realized when the longitudinal lead screw 34b turns to drive the nut seat 9b and the transverse base 6b. The right end portion of the longitudinal lead screw 34b is mounted on the two bearings 48b in the longitudinal bearing housing 38b for a free rotation. A scaled bearing cap 44b and a thrust bearing 49b are mounted in the longitudinal bearing housing 38b by means of bolts as shown, a scaled ring 46b is mounted around the right end portion of the longitudinal lead screw 34b and fixed on the longitudinally movable lead screw 34b by means of two locking round nuts 47b. A tolerance is provided between the scaled ring 46b and the lead screw so that the scaled ring 46b can randomly look for position "0" on the longitudinal bearing housing 38b. A locking bolt 45b is screwed through the scaled ring 46b for locking the scaled ring against the lead screw when the alignment 46b is confirmed. The right end of the longitudinal lead screw 34b is fixed to the back hand wheel 22b by means of a key for a manual rotation.

L-section steel bars 28b are mounted on both sides of longitudinally the movable base 1b by means of outside hex bolts 26b and washers 27b for a manual handling.

This structure is manually operated, i.e. rotation of the back hand wheel may achieve the movement of the transverse feeding assembly, and achieve manual operation. The hand wheel may be replaced by an adjustable-speed motor to achieve electrical control and automatic feeding.

A transverse feeding comprises: bracket 4b, water catcher 5b, transverse base 6b, circulation tool base 7b, fixed shaft 8b, railway 11b, bearing cap 21b, back hand wheel 22b, transverse front shield 29b, transverse rear shield 30b, transverse lead screw 32b, scaled bearing cap 44b, scaled ring 46b, locking round nut 47b, bearing 48b and thrust bearing 49b.

Two bearing housings 38b are mounted on the front and rear ends of the transverse base 6b and each of bearing housings 38b accommodates two bearing 48b. The Two front bearings 48b are fixed in the bearing housing 38b by means of a bearing cap 46b and the two rear bearings 48b are fixed in the rear bearing housing 48b by means of a scaled bearing cap 44b. The Front and rear ends of the transverse lead screw 32b are mounted on the inner racers of the bearing 48b for a free rotation. The Bearing 48b shall be filled with a grease for lubrication and the front bearing housing 38b is fit with the bearing cap 21b. The Transverse lead screw 32b is threaded through a nut seat 9b, which is fixed to the circulation tool base 7b by means of four bolts. When the transverse lead screw 32b rotates, the circulation tool base 7b can reciprocate. The Rear end of the transverse lead screw 32b is equipped with a back hand wheel 22b by means of a key. The Bearing housing 38b is equipped with the scaled bearing cap 44b and a thrust bearing 49b. A Scaled ring 46b is mounted around the transverse lead screw 32b with a tolerance therebetween and can be locked on the transverse lead screw 32b by means of two locking round nuts 47b. The scaled ring 46b can randomly look for position "0" on the transverse scaled bearing cap 44b. A Locking screw 45b is threaded through the scaled to lock the scale ring 46b. The right end of longitudinally movable lead screw 34b is equipped with the back hand wheel 22b by means of a key for a manual operation.

The railway 11b is mounted on the transverse base 6b by means of hexagon socket screws 17b and elastic washers 18b. The railway 11b has four rail sliders 10b connected with the circulation tool base 7b of an insulating material by means of bolts. Both ends of the railway 11b protrude above the hexagon bolt 17b and the elastic washer 18b for a position-limiting function.

5. Water Air Mixing System: Air-Liquid Flow Control System, Including Two Air Path System Embodiments:

The first embodiment: a water air mixing system for a portable pneumatic circulation tool: Y-shaped two-way fitting 44e, water air mixture 45e, Y-shaped quick connector 46e, threaded barrel 47e, water air mixture 48e, air pump and water pump. Refer to 31A2025-1 and a pneumatic circulation tool as shown in FIG. 6.

Compressed air provided by the air pump is connected to the Y-shaped quick connector 44 through an air pipe. The Y-shaped quick connector 44e provides a discharged or used air for the Y-shaped quick connector 46e of the water air mixture 45e through an air pipe and it also provides a working medium of water air mixture through a water air nipple 48e so as to recycle the used air. Water goes through T-shaped quick connector 45e through water pipe and is distributed to two couples of Y-shaped quick connector 46e with water air mixture 48e. Quick connector 46e and water air mixture 48e are connected through a threaded barrel 47e. A Control valve may be used for adjusting an inflow water volume if necessary and water can come from a water pump or a tap water. Compressed air can be used to suck a water source through water air mixture 48. The Produced water air mixture is used as a working medium.

The second embodiment: a water air mixing system for a movable pneumatic circulation device: including water pump, air pump, water pipe, air pipe, water air mixing device, and connectors. Refer to the figure for a circulation device.

The Cathode shield 13e is equipped with a water air mixing device and adjustment device. The water air mixing device can be adjusted up/down and up/down according work needs.

6. Hanger:

As shown in FIG. 5, a hanging bracket for a short-electric arc discharging processing toolhanger comprises a rotatable chassis 1d, a stand 4d, an adjustable cantilever 3d, a hanging means 11d, a winch 16d, a tension spring, a wire rope or reinforced fireproof rope, a pulley 25d and pulley yoke 28d, a safety buckle 6d, a hanging ring 9d, a supporting leg assembly 23d and a locking pin 24d.

The hanger comprises: a rotatable chassis 1d comprising a base 22d and an upper wheel; the base 22d is connected with the chassis by means of four bolts 31d and elastic washers 32d and the base 22d has a bore equipped with two bearings 29d and 30d. Such bearings support the upper wheel rotably.

The Chassis 1d comprises a connecting plate, one longer leg and two shorter legs perpendicular to each other, crossing the center of the connecting plate and welded to and along the connecting plate; there are four connecting holes in the connecting plate and the base 22*d* is fixed to the chassis 1*d* by means of these fore holes and four bolts 31*d* and elastic washer 32*d*; the wheel is provided with an axial shaft, a connecting plate, a stand tube and a reinforcing plate. The shaft is welded to one side of the connecting plate center, and the stand tube and the reinforcing plate are welded to another side of the connecting plate center. The shaft and the stand tube are co-axial with the connecting plate and the stand pipe is formed with two orthogonal through-holes for installation of the stand 4*d*.

The Stand 4*d* is fixed to the stand tube by means of nuts and bolts through the two orthogonal through-holes. The circulation device can be big or small, when overloaded, additional hanger may be needed to complete cleaning work of the short electric art.

7. Electric Connection System:

The positive pole of a short electric are cutting power supply is connected to with a work piece through a cable, and the negative of the short electric are cutting power supply is connected with a tool electrode through another cable.

8. Anode Device

The anode device comprises an electric collecting shaft 2*c* located by an anode collecting ring, an anode collectors 6*c*, an anode holder sleeve 15*c*, an anode bearing housing 16*c*, an anode connecting plate 1*c*, an electric brush component 3*c* and an electric brush bracket 4*c* and a pressure spring 5*c*.

This is a new type of add-on anode device suitable for on-site processing and random working conditions. In comparison with the previous anode device, this device can be added on the shaft end of the processing piece, the connection disk can be changed randomly according to the manner of working piece connection. In addition, it is compact and light, and it is easy to repair and serve. At the same time, the electricity collecting ring can be increased or reduced according to working needs. It also may be changed according to needs, inter-exchangeable and convenient to use.

The Anode collecting shaft 2*c* can be replaced after it is worn, without the need to completely scrap the whole anode device. This is an exchangeable anode device The anode device comprises: an anode connecting plate 1*c* connected with one end portion of the anode collecting shaft 2*c* by means of outside hex bolts and elastic washers 40*c* and another end portion thereof is threaded with an anode holder sleeve 15*c*. The thread may be levorotatory or dextral so as to prevent the anode holder sleeve 15*c* and the anode collecting shaft 2*c* from threading loose during operation.

A right end portion of the anode holder sleeve 15*c* is mounted on a bearing 17*c*. The anode holder sleeve 15*c* and the bearing 17*c* are locked axially against another by means of a collar 19 so as to prevent the bearing 17*c* from slipping off the anode holder sleeve 15*c*. The Bearing 17*c* is mounted in anode bearing housing 16*c* by means of an anode bearing cap 18*c* and hexagon socket screws 22*c* so that the anode connecting plate 1*c*, the anode collecting shaft 2*c* and the anode holder sleeve 15*c* can rotate stably. A grease fitting 21*c* is provided through the anode bearing cap 18*c* to lubricate the bearing 17*c*. A sealing ring 20*c* is inserted between the anode bearing cap 18*c* and the anode holder sleeve 15*c*.

The anode connecting plate 1*c*, the anode collecting shaft 2*c* and the anode holder sleeve 15*c* are cylindrically hollow for a reduced eddy-current heating effect during operation and for a bigger radiating area is also increased to stabilize the operation. The anode connecting plate 1*c*, the anode collecting shaft 2*c* and the anode holder sleeve 15*c* can be adapted to various current and voltage parameters, and any of them can be replaced easily. The complete product will not be scrapped due to a non-functional part.

A couple of L-shaped feet 29*c* is mounted with the anode bearing housing 16*c* by means of outside hex bolts 25*c*, nuts 26*c*, washers 27*c* and elastic washers 28*c*. The feet 29*c* are used to fix the housing to a stationary base.

Three holder rods 14*c* are extended Left-wards from and with the anode bearing housing 16*c*. A right end portion of each of the holder rods 14*c* is threaded into the anode bearing housing 16*c* and is fixed there with a nut, a washer and an elastic washer so as to prevent the holder rods 14*c* from movements.

The Three holder rods 14*c* are fixed with two anode collectors 6*c*. There may be one, two or more anode collectors 6*c* and the number cab crease or increase depending on the work needs. The anode collectors 6*c* and the holder rods are connected as follows: according to the position needs of the anode collecting shaft 2*c*, firstly determining the positions of the positioning nut and washer (see drawings) and insulating gasket 32*c* to make the nut and washer (see drawings) and insulating gasket on the same vertical plane; then installing three insulating sleeves 31*c* on the corresponding holes of the anode collectors 6*c*, respectively; finally installing the assembly of insulating sleeves 31*c* and anode collectors 6*c* on the holder rods 14*c*, fixed through nuts 37*c* and washers 38*c*. The insulating sleeves, insulating washers, nuts and washers all are the same types, namely, nuts 37*c*, washers 39*c*, insulating sleeve 31*c* and insulating gaskets 32*c*.

According to design needs, each of the two anode collectors 6*c* are connected with an electric brush 3*c* and an electric brush bracket 4*c* and a pressure spring 5*c* by means of a screw 11*c*, a washer 12*c* and a self-locking nut 13*c*. Each of the Electric brushes 3*c* is connected with the respective anode collector 6 through a copper wire and contacts frictionally the anode collecting shaft 2*c* as pressed by the electric brush bracket 4*c* and the pressure spring 5*c*. The Anode collector 6*c* are connected with a wiring board 30*c* by means of outside hexagon bolts 33*c*, nut 34*c*, washers 35*c* and elastic washers 36*c*. Another end of the wiring board 30*c* is connected to the negative pole of the short-electric arc power supply through a cable.

An anode shield 23*c* has an end portion mounted on the anode bearing housing 16*c* by means of round head screw 24*c*, and another end portion mounted on the anode connecting plate 1*c* to shield any splash away from between the electric brush 3*c* and the anode collecting shaft 2*c* and avoid affecting short arc processing efficiency.

The present invention provides a portable arc processing system and a portable arc cutting method including a handheld arc tool (a portable pneumatic circulation tool for a short electric arc process), a short electric arc power supply, an air-liquid mixing system and an auxiliary system. The system is similar to the operation mode of using a sand wheel to process work pieces. The system achieves elimination of the work piece through electrodes continuously discharging with the work piece by short arc connection and disconnection, and through co-actions of the air-liquid mixing medium. The work piece and the tool electrode are respectively connected to one end of the output terminal of the short arch power source.

According to processing needs, the work piece and tool electrodes are connected by the positive and negative terminals and achieve random discharging. This solved the difficult problems of processing conductive materials that are hard to process with a high efficiency. The tool electrode can rotate in a high speed; the electrode may be shaped like a rod, a sphere, an oval, a wheel, a disk or a round tube, which can be installed like a chip or direct mounted.

Finally, the above description describes some particular embodiments of the present invention, and shall not limit the scope the present invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

The invention claimed is:

1. A portable short electric arc processing system comprising:
    a cooling water tank, a short electric arc power supply, a circulation device, a feeding mechanism, a hanger and a pneumatic circulation tool mounted on the hanger, all of which are operatively connected and mounted on a horizontal plane; an air compressor and a draining pump both of which are successively connected to the feeding mechanism through pipeline; a sucking pump and a control cabinet for the short-electric arc processing system both of which are successively connected to the air compressor through a pipeline; an anode device which is connected to the control cabinet through a cable to a negative pole of the power supply; a cathode device which is connected to the control cabinet through a cable to a positive pole of the power supply; and a water pump which is connected to the cathode device through a pipeline;
    wherein said power supply is connected to the cooling water tank, the circulation device, the feeding mechanism, the sucking pump, the control cabinet, the anode device, the pneumatic circulation tool mounted on the hanger, the cathode device and the water pump, respectively;
    wherein the circulation device comprises a cathode base, a main cathode shaft mounted on the cathode base, a tool electrode fixed to an electrode base mounted on the left end of the cathode main-shaft, a pressure plate for mounting the tool electrode axially, the tool electrode and a shield bracket which are operatively connected and mounted on the left and right sides of the electrode base one by one upwards, a left water shield and a right water shield which are vertically mounted on both sides of the electrode base, a pair of electric collectors which are symmetrically mounted over and under the main cathode shaft, an insulation component which is mounted between said pair of electric collectors, a cathode shield which is mounted over said pair of electric collector, a motor which is mounted between the cathode shield and the upper electric collector, an electric brush which is mounted on the motor, a motor pulley, a ball bearing, a lead screw, a pulley bearing and a rear bearing cap all of which are cooperatively mounted on the motor, a tool electrode shield which is mounted on the right end portion of the main cathode shaft, and a grease fitting and a seal and a water-air mixing device which are mounted inside of a tool motor shield; and
    wherein the feeding mechanism comprises a longitudinal base which is set horizontally, a left shield, a railway, a bracket and a water catcher which are mounted over a left end portion of the longitudinal base, a transverse base which is mounted on a middle portion of the longitudinal base, and a right shield which is mounted on a right end portion of the longitudinal base;
    a circulation tool base which is mounted on the transverse base, a fixed shaft which is mounted on the circulation tool base, a nut seat and a rail slider which are mounted between the transverse base and the circulation tool base, and a railway which is mounted on the rail slider;
    a back hand wheel which is mounted on the right end portion of the longitudinal base, a bearing cap which is mounted between the back hand wheel and the longitudinal base, a transverse front shield and a transverse rear shield which are mounted on the front and rear sides of the longitudinal base which is close to the back hand wheel, a transverse lead screw and a longitudinal lead screw which are mounted under the transverse rear shield, a bearing housing which is mounted in the longitudinally movable base close to the back hand wheel, a ball bearing and a thrust bearing which are mounted in the bearing housing; and a guiding rail hole cover which is mounted between the longitudinal base and the transverse base.

2. The portable short electric arc processing system according to claim 1, wherein the anode device comprises an anode connecting plate which is set vertically, an anode collecting shaft and an anode holder sleeve which are mounted on the anode connecting plate from left to right, an electric brush component, a pressure spring and an anode collector which are located over the anode collecting shaft from left to right, a lead screw which is set horizontally over the anode collecting shaft, an anode bearing housing which is located over the anode holder sleeve and mounted vertically on a right end portion of the lead screw; a ball bearing, an anode bearing end cap and a sealing which are cooperatively mounted between the anode bearing housing and the anode holder sleeve; and a grease fitting, a wiring board and an insulation which are located under the anode holder sleeve and mounted on the anode bearing housing.

3. The portable short electric arc processing system according to claim 1, wherein the circulation device comprises a portable pneumatic circulation tool for a short electric arc processing.

4. The portable short electric arc processing system according to claim 3, wherein the portable pneumatic circulation tool comprises an electrode mounting shaft which is set horizontally, a tool electrode which is vertically mounted on the left end portion of the electrode mounting shaft, an electric collecting ring, a ceramic bearing, a spacer, an electric brush component, an electric collector, a first bearing and a connecting shaft which are cooperatively mounted on the electrode mounting shaft one by one from left to right, a second bearing which is located on the right side of the connecting shaft and vertically mounted on the electrode mounting shaft, a main body, a blade-type pneumatic motor, a base, a body valve core, a regulating switch, a handle and a quick air-pipe fitting which are located on the right side of the second bearing and cooperatively mounted on the electrode mounting shaft one by one from left to right, and a strut, a spacer, a handle and a Y-shaped air-pipe fitting which are located under the electrode mounting shaft and cooperatively mounted on the electrode mounting shaft.

5. The portable short electric arc processing system according to claim 3, wherein the hanger comprises a chassis which is set horizontally, a wheel which is vertically mounted on the chassis, a stand which is vertically mounted on the top of the wheel, an adjustable horizontal arm which is horizontally mounted on the top of the stand, a locking component which is aslant mounted between an end portion of the adjustable horizontal arm assembly and the wheel, a bracket and a manual winch which are cooperatively mounted between the locking component and the wheel, a chassis base which is mounted between the chassis and the wheel;

a pulley set and a roller bracket which are mounted between the end portion of the adjustable horizontal arm and the locking component, legs and a bearing which are mounted on the bottom of the chassis, and a remote control box of the power supply and a pneumatic circulation tool which are mounted on the wheel.

6. The portable short electric arc processing system according to claim 1, wherein the power supply comprises a main circuit, a control circuit, a display circuit and a protection circuit, and the control circuit is connected to the main circuit, the display circuit and the protection circuit, respectively.

7. The portable short electric arc processing system according to claim 6, wherein the main circuit comprises an AC supply voltage display circuit, an RC resistance-capacitance absorption circuit, a primary voltage regulating circuit, a rectifier transformer, a secondary rectifying circuit, a diverter output circuit and an overload protection and display circuit which are connected operatively; and the control circuit, the protection circuit and the display circuit are made of a control panel and electrical elements, the protection circuit and the display circuit are incorporated into the control circuit.

8. The portable short electric arc processing system according to claim 4, wherein the hanger comprises a chassis which is set horizontally, a wheel which is vertically mounted on the chassis, a stand which is vertically mounted on the top of the wheel, an adjustable horizontal arm which is horizontally mounted on the top of the stand, a locking component which is aslant mounted between an end portion of the adjustable horizontal arm assembly and the wheel, a bracket and a manual winch which are cooperatively mounted between the locking component and the wheel, a chassis base which is mounted between the chassis and the wheel;

a pulley set and a roller bracket which are mounted between the end portion of the adjustable horizontal arm and the locking component, legs and a bearing which are mounted on the bottom of the chassis, and a remote control box of the power supply and a pneumatic circulation tool which are mounted on the wheel.

\* \* \* \* \*